US012095877B2

(12) United States Patent
Papakostas et al.

(10) Patent No.: US 12,095,877 B2
(45) Date of Patent: *Sep. 17, 2024

(54) METHODS AND APPARATUS TO IMPROVE USAGE CREDITING IN MOBILE DEVICES

(71) Applicant: The Nielsen Company (US), LLC, New York, NY (US)

(72) Inventors: Achilleas Papakostas, Dallas, TX (US); Susan Cimino, Odessa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/329,568

(22) Filed: Jun. 5, 2023

(65) Prior Publication Data
US 2023/0396691 A1 Dec. 7, 2023

Related U.S. Application Data

(63) Continuation of application No. 17/850,910, filed on Jun. 27, 2022, now Pat. No. 11,671,511, which is a
(Continued)

(51) Int. Cl.
*H04L 67/50* (2022.01)
*H04L 65/1045* (2022.01)
(Continued)

(52) U.S. Cl.
CPC ........ *H04L 67/535* (2022.05); *H04L 65/1045* (2022.05); *H04L 65/1066* (2013.01); *H04L 65/1083* (2013.01); *H04L 67/02* (2013.01)

(58) Field of Classification Search
CPC ...................................................... H04L 67/02
See application file for complete search history.

(56) References Cited

U.S. PATENT DOCUMENTS 4,355,372 A 10/1982 Johnson
RE31,951 E 7/1985 Johnson et al.
(Continued)

FOREIGN PATENT DOCUMENTS

AU 2011211443 A1 3/2012
AU 2011211444 A1 3/2012
(Continued)

OTHER PUBLICATIONS

Diffie et al, "Privacy and Authentication: An Introduction to Cryptography," Proceedings of the IEEE, vol. 67, No. 3, Mar. 1979, 32 pages.
(Continued)

*Primary Examiner* — Clayton R Williams

(57) ABSTRACT

Methods, apparatus, systems and articles of manufacture are disclosed including means for identifying to identify a first request having a first source port number, from a device, determine whether a second request, having a second source port number, is within a threshold number of ports from the first source port number, group the first and the second requests as a first session when the second source port number is within the threshold number of ports from the first source port number, and means for classifying to generate session windows, the session windows including the threshold number of ports, wherein the session windows are applied to lowest and highest source port numbers associated with a current session.

20 Claims, 10 Drawing Sheets

Related U.S. Application Data continuation of application No. 17/063,652, filed on Oct. 5, 2020, now Pat. No. 11,418,610, which is a continuation of application No. 16/377,973, filed on Apr. 8, 2019, now Pat. No. 10,798,192, which is a continuation of application No. 15/700,883, filed on Sep. 11, 2017, now Pat. No. 10,257,297, which is a continuation of application No. 14/529,784, filed on Oct. 31, 2014, now Pat. No. 9,762,688.

(51) Int. Cl.
  *H04L 65/1066* (2022.01)
  *H04L 65/1083* (2022.01)
  *H04L 67/02* (2022.01)

(56) References Cited

U.S. PATENT DOCUMENTS

| | | |
|---|---|---|
| 4,603,232 A | 7/1986 | Kurland |
| 4,954,699 A | 9/1990 | Coffey |
| 4,958,284 A | 9/1990 | Bishop |
| 5,023,929 A | 6/1991 | Call |
| 5,060,140 A | 10/1991 | Brown |
| 5,481,294 A | 1/1996 | Thomas et al. |
| 5,488,408 A | 1/1996 | Maduzia |
| 5,497,185 A | 3/1996 | Dufresne |
| 5,526,427 A | 6/1996 | Thomas |
| 5,550,928 A | 8/1996 | Lu |
| 5,557,686 A | 9/1996 | Brown |
| 5,584,050 A | 12/1996 | Lyons |
| 5,594,934 A | 1/1997 | Lu et al. |
| 5,659,469 A | 8/1997 | Deaton |
| 5,675,510 A | 10/1997 | Coffey |
| 5,689,799 A | 11/1997 | Dougherty |
| 5,710,887 A | 1/1998 | Chelliah |
| 5,715,399 A | 2/1998 | Bezos |
| 5,732,218 A | 3/1998 | Bland |
| 5,737,025 A | 4/1998 | Dougherty |
| 5,737,026 A | 4/1998 | Lu |
| 5,751,450 A | 5/1998 | Robinson |
| 5,771,307 A | 6/1998 | Lu |
| 5,781,913 A | 7/1998 | Felsenstein |
| 5,790,875 A | 8/1998 | Andersin |
| 5,848,396 A | 12/1998 | Gerace |
| 5,850,249 A | 12/1998 | Massetti |
| 5,862,325 A | 1/1999 | Reed |
| 5,872,850 A | 2/1999 | Klein |
| 5,887,140 A | 3/1999 | Itsumi |
| 5,889,548 A | 3/1999 | Chan |
| 5,961,593 A | 10/1999 | Gabber |
| 5,970,469 A | 10/1999 | Scroggie |
| 5,991,735 A | 11/1999 | Gerace |
| 6,006,260 A | 12/1999 | Barrick, Jr. |
| 6,026,367 A | 2/2000 | Hjelmvik |
| 6,026,368 A | 2/2000 | Brown |
| 6,052,730 A | 4/2000 | Felciano |
| 6,055,573 A | 4/2000 | Gardenswartz |
| 6,058,381 A | 5/2000 | Nelson |
| 6,070,145 A | 5/2000 | Pinsley |
| 6,070,148 A | 5/2000 | Mori et al. |
| 6,081,900 A | 6/2000 | Subramaniam |
| 6,108,637 A | 8/2000 | Blumenau |
| 6,115,680 A | 9/2000 | Coffee |
| 6,128,624 A | 10/2000 | Papierniak |
| 6,138,162 A | 10/2000 | Pistriotto et al. |
| 6,138,165 A | 10/2000 | Nakatsugawa |
| 6,141,686 A | 10/2000 | Jackowski |
| 6,151,593 A | 11/2000 | Cho |
| 6,286,043 B1 | 9/2001 | Cuomo |
| 6,286,046 B1 | 9/2001 | Bryant |
| 6,321,336 B1 | 11/2001 | Applegate |
| 6,351,467 B1 | 2/2002 | Dillon |
| 6,381,632 B1 | 4/2002 | Lowell |
| 6,421,733 B1 | 7/2002 | Tso |
| 6,449,251 B1 | 9/2002 | Awadallah |
| 6,463,187 B1 | 10/2002 | Baruch et al. |
| 6,487,538 B1 | 11/2002 | Gupta |
| 6,507,589 B1 | 1/2003 | Ramasubramani |
| 6,530,025 B1 | 3/2003 | Nakagawa et al. |
| 6,567,857 B1 | 5/2003 | Gupta |
| 6,606,581 B1 | 8/2003 | Nickerson |
| 6,658,414 B2 | 12/2003 | Bryan |
| 6,704,787 B1 | 3/2004 | Umbreit |
| 6,822,955 B1 | 11/2004 | Brothers et al. |
| 6,839,680 B1 | 1/2005 | Liu |
| 6,856,963 B1 | 2/2005 | Hurwitz |
| 6,865,613 B1 | 3/2005 | Millet |
| 6,993,590 B1 | 1/2006 | Gauthier |
| 7,003,555 B1 | 2/2006 | Jungck |
| 7,039,599 B2 | 5/2006 | Merriman |
| 7,065,505 B2 | 6/2006 | Stefik |
| 7,080,077 B2 | 7/2006 | Ramamurthy |
| 7,092,926 B2 | 8/2006 | Cerrato |
| 7,092,942 B2 | 8/2006 | Frieden |
| 7,159,023 B2 | 1/2007 | Tufts |
| 7,181,412 B1 | 2/2007 | Fulgoni |
| 7,200,632 B1 | 4/2007 | Greschler et al. |
| 7,216,149 B1 | 5/2007 | Briscoe |
| 7,257,836 B1 | 8/2007 | Moore et al. |
| 7,260,837 B2 | 8/2007 | Abraham |
| 7,277,915 B2 | 10/2007 | De Boor |
| 7,366,724 B2 | 4/2008 | Frieden |
| 7,375,641 B2 | 5/2008 | Kiel |
| 7,376,722 B1 | 5/2008 | Sim |
| 7,380,218 B2 | 5/2008 | Rundell |
| 7,526,538 B2 | 4/2009 | Wilson |
| 7,584,423 B2 | 9/2009 | Rohrbaugh |
| 7,606,897 B2 | 10/2009 | Izrailevsky |
| 7,609,711 B2 | 10/2009 | Kyung |
| 7,613,809 B2 | 11/2009 | Jackson |
| 7,688,813 B2 | 3/2010 | Shin |
| 7,695,879 B2 | 4/2010 | Vanbesien |
| 7,814,483 B2 | 10/2010 | Li |
| 7,849,502 B1 | 12/2010 | Bloch |
| 7,925,515 B2 | 4/2011 | Xu |
| 8,018,666 B2 | 9/2011 | Kakuta |
| 8,086,219 B2 | 12/2011 | O'Neil |
| 8,285,218 B2 | 10/2012 | Papakostas |
| 8,307,006 B2 | 11/2012 | Hannan |
| 8,340,711 B1 | 12/2012 | Glass |
| 8,483,765 B2 | 7/2013 | Cho |
| 8,594,617 B2 | 11/2013 | Papakostas |
| 8,635,129 B2 | 1/2014 | Story |
| 8,649,292 B2 | 2/2014 | Zheng |
| 8,755,511 B2 | 6/2014 | Duva |
| 8,774,214 B1 | 7/2014 | Madhavarapu et al. |
| 8,775,571 B2 | 7/2014 | Srinivasan |
| 8,799,514 B1 * | 8/2014 | Vautrin .................. G06F 9/5011 709/224 |
| 8,886,773 B2 | 11/2014 | Papakostas |
| 8,910,259 B2 | 12/2014 | Papakostas |
| 9,112,919 B1 | 8/2015 | Vinapamula Venkata |
| 9,301,173 B2 | 3/2016 | Papakostas |
| 9,307,418 B2 | 4/2016 | Papakostas |
| 9,736,136 B2 | 8/2017 | Papakostas |
| 9,762,688 B2 | 9/2017 | Papakostas |
| 10,021,589 B2 * | 7/2018 | Bertz .................. H04L 41/5009 |
| 10,257,297 B2 | 4/2019 | Papakostas |
| 10,320,925 B2 | 6/2019 | Papakostas |
| 10,356,579 B2 | 7/2019 | Papakostas |
| 10,798,192 B2 | 10/2020 | Papakostas |
| 10,965,765 B2 | 3/2021 | Papakostas |
| 11,418,610 B2 | 8/2022 | Papakostas et al. |
| 11,423,420 B2 | 8/2022 | Papakostas et al. |
| 11,438,429 B2 | 9/2022 | Papakostas et al. |
| 11,510,037 B2 | 11/2022 | Papakostas et al. |
| 11,671,511 B2 | 6/2023 | Papakostas et al. |
| 2001/0014915 A1 | 8/2001 | Blumenau |
| 2001/0020242 A1 | 9/2001 | Gupta |
| 2002/0069368 A1 | 6/2002 | Hines |
| 2002/0077903 A1 | 6/2002 | Feldman et al. |
| 2002/0116523 A1 | 8/2002 | Warrier et al. |
| 2002/0124074 A1 | 9/2002 | Levy et al. |

(56) References Cited

U.S. PATENT DOCUMENTS

| | | |
|---|---|---|
| 2002/0128803 A1 | 9/2002 | Skinner et al. |
| 2002/0144156 A1 | 10/2002 | Copeland, III |
| 2002/0165928 A1 | 11/2002 | Landfeldt |
| 2002/0169830 A1 | 11/2002 | Mild et al. |
| 2002/0178257 A1 | 11/2002 | Cerrato |
| 2003/0009762 A1 | 1/2003 | Hooper |
| 2003/0018778 A1 | 1/2003 | Martin |
| 2003/0033432 A1 | 2/2003 | Simpson |
| 2003/0035409 A1 | 2/2003 | Wang et al. |
| 2003/0051052 A1 | 3/2003 | Shteyn |
| 2003/0065595 A1 | 4/2003 | Anglum |
| 2003/0076305 A1 | 4/2003 | Allen |
| 2003/0091025 A1 | 5/2003 | Celi |
| 2003/0135411 A1 | 7/2003 | Ushiki et al. |
| 2003/0154306 A1 | 8/2003 | Perry |
| 2003/0163370 A1 | 8/2003 | Chen et al. |
| 2003/0195884 A1 | 10/2003 | Boyd |
| 2004/0133687 A1 | 7/2004 | Yamaguchi |
| 2004/0205159 A1 | 10/2004 | Johnson |
| 2005/0021603 A1 | 1/2005 | Yokomitsu |
| 2005/0108539 A1 | 5/2005 | Skog |
| 2005/0132030 A1 | 6/2005 | Hopen et al. |
| 2005/0138192 A1 | 6/2005 | Encarnacion |
| 2005/0198261 A1 | 9/2005 | Durvasula |
| 2005/0201357 A1 | 9/2005 | Poyhonen |
| 2005/0213057 A1 | 9/2005 | Nakayama |
| 2005/0213511 A1 | 9/2005 | Reece et al. |
| 2005/0235030 A1 | 10/2005 | Lauckhart et al. |
| 2006/0133332 A1 | 6/2006 | Achanta |
| 2006/0258341 A1 | 11/2006 | Miller |
| 2006/0264202 A1 | 11/2006 | Hagmeier |
| 2006/0274774 A1 | 12/2006 | Srinivasan |
| 2006/0274775 A1 | 12/2006 | Kyung |
| 2007/0073625 A1 | 3/2007 | Shelton |
| 2007/0089110 A1 | 4/2007 | Li |
| 2007/0123760 A1 | 5/2007 | Scholler |
| 2007/0198364 A1 | 8/2007 | Quoc et al. |
| 2007/0214501 A1 | 9/2007 | Muramoto |
| 2007/0222598 A1 | 9/2007 | Kiel |
| 2007/0233857 A1 | 10/2007 | Cheng et al. |
| 2007/0244875 A1 | 10/2007 | Bodin et al. |
| 2007/0260736 A1 | 11/2007 | Miller |
| 2007/0274211 A1 | 11/2007 | Tsubota |
| 2008/0005736 A1 | 1/2008 | Apacible |
| 2008/0056261 A1 | 3/2008 | Osborn |
| 2008/0126420 A1 | 5/2008 | Wright |
| 2008/0209050 A1 | 8/2008 | Li |
| 2008/0256235 A1 | 10/2008 | Or et al. |
| 2008/0289010 A1 | 11/2008 | Frieden |
| 2009/0034536 A1 | 2/2009 | Morand |
| 2009/0036108 A1 | 2/2009 | Cho |
| 2009/0089356 A1 | 4/2009 | Murray |
| 2009/0106035 A1 | 4/2009 | Xu |
| 2009/0181662 A1 | 7/2009 | Fleischman et al. |
| 2009/0233633 A1 | 9/2009 | Morrison |
| 2009/0282471 A1 | 11/2009 | Green |
| 2009/0285118 A1 | 11/2009 | Yoshikawa |
| 2009/0296917 A1 | 12/2009 | Nogawa |
| 2009/0320123 A1 | 12/2009 | Yu et al. |
| 2010/0036969 A1 | 2/2010 | Perry |
| 2010/0095215 A1 | 4/2010 | Elven |
| 2010/0191947 A1 | 7/2010 | Shin |
| 2010/0205029 A1 | 8/2010 | Asherman |
| 2010/0205617 A1 | 8/2010 | Hogan |
| 2010/0216434 A1 | 8/2010 | Marcellino |
| 2010/0238837 A1 | 9/2010 | Zheng |
| 2010/0293610 A1 | 11/2010 | Beachem |
| 2010/0316540 A1 | 12/2010 | Hamel et al. |
| 2011/0029988 A1 | 2/2011 | Mittal |
| 2011/0047254 A1 | 2/2011 | Vainionpaeae |
| 2011/0135889 A1 | 6/2011 | Tiller et al. |
| 2011/0167101 A1 | 7/2011 | Hopen et al. |
| 2011/0173525 A1 | 7/2011 | Mukhopadhyay et al. |
| 2011/0252430 A1 | 10/2011 | Chapman |
| 2011/0296416 A1 | 12/2011 | Kim |
| 2012/0007932 A1 | 1/2012 | Yokoyama |
| 2012/0042005 A1* | 2/2012 | Papakostas ......... H04L 63/1408 709/217 |
| 2012/0042367 A1 | 2/2012 | Papakostas |
| 2012/0070932 A1 | 3/2012 | Toda et al. |
| 2012/0158908 A1 | 6/2012 | Luna et al. |
| 2012/0210321 A1 | 8/2012 | Silva |
| 2012/0216063 A1 | 8/2012 | Ogata |
| 2012/0235930 A1 | 9/2012 | Lazaridis |
| 2012/0271719 A1 | 10/2012 | Straley |
| 2012/0295581 A1 | 11/2012 | Agarwal |
| 2012/0324060 A1 | 12/2012 | Afergan |
| 2013/0005296 A1 | 1/2013 | Papakostas |
| 2013/0006708 A1 | 1/2013 | Lee |
| 2013/0024812 A1 | 1/2013 | Reeves et al. |
| 2013/0031599 A1 | 1/2013 | Luna et al. |
| 2013/0035059 A1 | 2/2013 | Liu |
| 2013/0054402 A1 | 2/2013 | Asherman |
| 2013/0064109 A1 | 3/2013 | Combet |
| 2013/0066875 A1 | 3/2013 | Combet |
| 2013/0183926 A1 | 7/2013 | Lindberg |
| 2013/0276129 A1 | 10/2013 | Nelson |
| 2013/0281050 A1 | 10/2013 | Agarwal |
| 2013/0311780 A1 | 11/2013 | Besehanic |
| 2013/0314491 A1 | 11/2013 | Vivekanandan |
| 2014/0036687 A1 | 2/2014 | Papakostas |
| 2014/0204816 A1 | 7/2014 | Ismail |
| 2014/0223441 A1 | 8/2014 | Banda |
| 2014/0273923 A1 | 9/2014 | Papakostas |
| 2014/0280896 A1 | 9/2014 | Papakostas |
| 2014/0297719 A1 | 10/2014 | Laasik |
| 2014/0317114 A1 | 10/2014 | Alla et al. |
| 2015/0007256 A1 | 1/2015 | Kirkeby |
| 2015/0058958 A1 | 2/2015 | Papakostas |
| 2015/0067162 A1 | 3/2015 | Papakostas |
| 2015/0088890 A1 | 3/2015 | Hoffert |
| 2016/0127488 A1 | 5/2016 | Papakostas |
| 2016/0232438 A1 | 8/2016 | Williams et al. |
| 2016/0232538 A1 | 8/2016 | Papakostas |
| 2016/0232539 A1 | 8/2016 | Morinaga et al. |
| 2016/0285976 A1 | 9/2016 | Chan |
| 2017/0085579 A1* | 3/2017 | Ionescu ............... H04L 63/1433 |
| 2017/0347152 A1 | 11/2017 | Yam et al. |
| 2017/0374169 A1 | 12/2017 | Papakostas |
| 2019/0306260 A1 | 10/2019 | Papakostas et al. |
| 2021/0021683 A1 | 1/2021 | Papakostas et al. |
| 2021/0218820 A1 | 7/2021 | Papakostas et al. |
| 2022/0329667 A1 | 10/2022 | Papakostas et al. |
| 2023/0097078 A1 | 3/2023 | Papakostas et al. |
| 2023/0127341 A1 | 4/2023 | Papakostas et al. |

FOREIGN PATENT DOCUMENTS

| | | |
|---|---|---|
| AU | 2012203829 A1 | 1/2013 |
| AU | 2011211444 B2 | 5/2014 |
| AU | 2012203829 B2 | 6/2014 |
| AU | 2014210640 A1 | 8/2014 |
| AU | 2014210640 B2 | 5/2016 |
| AU | 2014210640 C1 | 10/2016 |
| CA | 2782018 A1 | 6/2011 |
| CA | 2748997 A1 | 2/2012 |
| CA | 2749013 A1 | 2/2012 |
| CA | 2781018 A1 | 12/2012 |
| CA | 2781018 C | 12/2015 |
| CA | 2748997 C | 3/2018 |
| CA | 2749013 C | 9/2020 |
| CN | 1433537 A | 7/2003 |
| CN | 1909739 A | 2/2007 |
| CN | 101059443 A | 10/2007 |
| CN | 101322432 A | 12/2008 |
| CN | 101547412 A | 9/2009 |
| CN | 101594243 A | 12/2009 |
| CN | 101594443 A | 12/2009 |
| CN | 101605030 A | 12/2009 |
| CN | 101909739 A | 12/2010 |
| CN | 102377616 A | 3/2012 |
| CN | 102377617 A | 3/2012 |
| CN | 101605030 B | 9/2012 |
| CN | 102917003 A | 2/2013 |

(56) References Cited

FOREIGN PATENT DOCUMENTS

| | | |
|---|---|---|
| CN | 102377616 B | 10/2014 |
| CN | 104219108 A | 12/2014 |
| CN | 102917003 B | 6/2015 |
| CN | 105025081 A | 11/2015 |
| CN | 104219108 B | 12/2018 |
| CN | 105025081 B | 5/2019 |
| EP | 1980950 A1 | 10/2008 |
| EP | 2079256 A1 | 7/2009 |
| EP | 2341437 A2 | 7/2011 |
| EP | 2341437 A3 | 10/2011 |
| EP | 2418820 A2 | 2/2012 |
| EP | 2418826 A1 | 2/2012 |
| EP | 2549713 A2 | 1/2013 |
| EP | 2549713 A3 | 5/2013 |
| EP | 2079256 B1 | 7/2016 |
| EP | 2549713 B1 | 9/2016 |
| EP | 1980950 B1 | 3/2019 |
| EP | 2418820 B1 | 1/2020 |
| EP | 2418826 B1 | 10/2020 |
| EP | 3771183 A1 | 1/2021 |
| FR | 2874779 A1 | 3/2006 |
| GB | 2437842 A | 11/2007 |
| HK | 1205386 A1 | 12/2015 |
| JP | H11338799 A | 12/1999 |
| JP | 2001282653 A | 10/2001 |
| JP | 2001285916 A | 10/2001 |
| JP | 2002109135 A | 4/2002 |
| JP | 2003208373 A | 7/2003 |
| JP | 2003219467 A | 7/2003 |
| JP | 2003271486 A | 9/2003 |
| JP | 2003345711 A | 12/2003 |
| JP | 2004007378 A | 1/2004 |
| JP | 2004342080 A | 12/2004 |
| JP | 2005115473 A | 4/2005 |
| JP | 2006023883 A | 1/2006 |
| JP | 2006044820 A | 2/2006 |
| JP | 2007123760 A | 5/2007 |
| JP | 2007184892 A | 7/2007 |
| JP | 2007200209 A | 8/2007 |
| JP | 2008511229 A | 4/2008 |
| JP | 2008257627 A | 10/2008 |
| JP | 2009514050 A | 4/2009 |
| JP | 2010079831 A | 4/2010 |
| JP | 2010134854 A | 6/2010 |
| JP | 2012053870 A | 3/2012 |
| JP | 2012053871 A | 3/2012 |
| JP | 2013016169 A | 1/2013 |
| JP | 5404714 B2 | 2/2014 |
| KR | 20050008068 A | 1/2005 |
| WO | 9641495 A1 | 12/1996 |
| WO | 9831155 A2 | 7/1998 |
| WO | 0011506 A1 | 3/2000 |
| WO | 0055783 A1 | 9/2000 |
| WO | 0111506 A1 | 2/2001 |
| WO | 0144975 A2 | 6/2001 |
| WO | 0152462 A2 | 7/2001 |
| WO | 0152462 A3 | 1/2002 |
| WO | 0250694 A1 | 6/2002 |
| WO | 03067376 A2 | 8/2003 |
| WO | 2005006703 A2 | 1/2005 |
| WO | 2006044820 A2 | 4/2006 |
| WO | 2007123760 A2 | 11/2007 |
| WO | 2009036190 A1 | 3/2009 |
| WO | 2010123385 A1 | 10/2010 |
| WO | 2014143969 A2 | 9/2014 |
| WO | 2016108917 A1 | 7/2016 |

OTHER PUBLICATIONS

Dossick et al., "WWW Access to Legacy Client/Server Applications," Fifth International World Wide Web Conference, May 6-10, 1996, retrieved from < http://iw3c2.cs.ust.hk/WWW5/www5conf.inria.fr/fich—html/papers/P4/Overview.html >, retrieved on Sep. 1, 2010, 12 pages.

Boyan, J. "The Anonymizer-Protecting User Privacy on the Web," Computer-Mediated Communication Magazine, Online! 1997, XP002231197, http://www.december.com/cmc/mag/1997/sep/toc.html, retrieved in 1997, 6 pages.

Choo et al., "A Behavioral Model of Information Seeking on the Web—Preliminary Results of a Study of How Managers and IT Specialists Use the Web," Oct. 1998, 16 pages.

Zenel et al., "A General Purpose Proxy Filtering Mechanism Applied to the Mobile Environment," Wireless Networks, ACM, vol. 5, No. 5, dated Oct. 1999, 9 pages.

Srivastava et al, "Web Usage Mining: Discovery and Applications of Usage Patterns from Web Data," ACM SIGKDD Explorations Newsletter, vol. 1, Issue 2, Jan. 2000, 12 pages.

Apple Support Communities, "HTTP Proxy Authentication and iPhone Apps", XP55009373, retrieved from <https://discussions.apple.com/message/8018666#8018666>, Jan. 15, 2009, 6 pages.

Fecheyr-Lippens, "A Review of HTTP Live Streaming," https://www.semanticscholar.org/paper/A-Review-of-HTTP-Live-Streaming-Fecheyr-Lippens/57d33cda30c2d497b694470aaa8b502613851fa5. Jan. 2010. 30 pages.

Wavecrest Computing, "Cyfin Proxy User Manual for Version 8.2.x," XP55009573, retrieved from <http://downloads.wavecrest.net/release/cyfin/manuals/v820/cyfinProxyManual.pdf>, Apr. 9, 2010, 147 pages.

Finjan Software Inc., "User Identification and Authentication—Vital Security 9.2," Finjan Vital Security, 1996-20080, retrieved from <http://m86security.com/software/secure—web—gateway/manuals.9.2.0/User—identification—and—Authentication.pdf>, Apr. 25, 2010, 27 pages.

European Patent Office, "European Search Report," issued in connection with European patent application No. 11006705.5, Oct. 14, 2011, 7 pages.

European Patent Office, "Partial European Search Report," issued in connection with European patent application No. 11006706.3, dated Oct. 25, 2011, 4 pages.

Japanese Patent Office, "Decision of Refusal," issued in connection with Japanese Patent Application No. 2012-145685, dated Jan. 7, 2014, 2 pages. (English translation included).

United States Patent and Trademark Office, "Non-Final Office Action," issued in U.S. Appl. No. 12/856,651, mailed on Mar. 27, 2012, 11 pages.

European Patent Office, "European Search Report," issued in connection with European patent application No. 11006706.3, Apr. 5, 2012, 14 pages.

United State Patent and Trademark Office, "Non-Final Rejection," issued in connection with U.S. Appl. No. 12/856,643, dated Jun. 18, 2012, 8 Pages.

United States Patent and Trademark Office, "Non-Final Action," issued in U.S. Appl. No. 13/174,517, on Aug. 15, 2012, 12 pages.

Japanese Patent Office, "Search Report," issued in connection with Japanese Patent Application No. 2011177690, dated Aug. 16, 2012, 19 pages. (English translation included).

Japanese Patent Office, "Decision of Refusal" issued in connection with Japanese Patent Application No. 2011-177690, dated Nov. 26, 2013, 2 pages. (English Translation Included).

Japanese Patent Office, "Notice of Reasons for Refusal," issued in connection with Japanese Patent Application No. 2011-177687, dated Aug. 21, 2012, 6 pages. (English translation included).

Japanese Patent Office, "Notice of Reasons for Refusal" issued in connection with Japanese Patent Application No. 2011-177690, dated Aug. 21, 2012, 7 pages. (English Translation Included).

European Patent Office, "European Search Report (R. 64 EPC)," issued in connection with European patent application No. 12004911.9, Dec. 13, 2012, 7 pages.

Papakostas et al., "Systems, Methods, and Apparatus to Monitor Mobile Internet Usage," U.S. Appl. No. 13/840,594, filed Mar. 15, 2013, 74 pages.

IP Australia, "Patent Examination Report No. 1," issued in connection with Australian Patent Application No. 20110211443, mailed Apr. 2, 2013, 3 pages.

Australian Government, IP Australia,"Patent Examination Report No. 1," issued in connection with AU Application No. 2011211444, issued on Apr. 2, 2013, 3 pages.

(56) References Cited

OTHER PUBLICATIONS

European Patent Office, "European Search Report," issued in connection with European patent application No. 12004911.9, Apr. 3, 2013, 10 pages.
United States Patent and Trademark Office, "Advisory Action," issued in connection with U.S. Appl. No. 12/856,651, mailed Nov. 22, 2013, 2 pages.
Japanese Patent Office, "Search Report," issued in connection with Japanese Patent Appl. No. 2012-145685, dated Apr. 10, 2013, 35 pages. [English translation included].
Japanese Patent Office, "Notice of Reasons for Refusal," issued in connection with Japanese Patent Application No. 2012-145685, dated May 7, 2013, 4 pages. (English translation included).
United State Patent and Trademark Office, "Final Rejection," issued in connection with U.S. Appl. No. 12/856,643, dated May 9, 2013, 10 Pages.
IP Australia, "Examination Report" issued in connection with Australian Patent Application No. 20120203829, mailed May 21, 2013, 3 pages.
Japanese Patent Office, "Notice of Reasons for Rejection," issued in Patent application No. P2011-177690, dated May 29, 2013, 8 pages. (English translation included).
Sanchez et al., "ZSim: Fast and Accurate Microarchitectural Simulation of Thousand-Core Systems," ACM SIGARCH Computer Architecture News, Jun. 2013, 12 pages.
Japanese Patent Office, "Notice of Reasons for Refusal," issued in connection with Japanese Patent Application No. 2011-177687, dated Jun. 4, 2013, 5 pages. (English translation included).
Japanese Patent Office, "Notice of Reasons for Refusal," issued in connection with Japanese Patent Application No. 2011-177690, dated Jun. 25, 2013, 8 pages. (English Translation Included).
United States Patent and Trademark Office, "Notice of Allowance," issued in connection with U.S. Appl. No. 13/174,517, filed Aug. 22, 2013, 52 pages.
United States Patent and Trademark Office, "Final Office Action," issued in connection with U.S. Appl. No. 12/856,651, dated Aug. 28, 2013, 16 pages.
State Intellectual Property Office of China, "First Search," issued in connection with Chinese Application No. 2011103054851, dated Aug. 29, 2013, 2 pages. (English translation included).
Canadian Intellectual Property Office, "Examiner's Report," issued in connection with Canadian Patent Application No. 2,749,013, dated Sep. 10, 2013, 2 pages.
The State Intellectual Property Office of People's Republic of China, "The First Office Action," issued in connection with Chinese Patent Application No. 201110305485.1, dated Sep. 22, 2013, 17 Pages. (English translation included).
United States Patent and Trademark Office, "Notice of Allowance," issued in U.S. Appl. No. 13/174,517 on Sep. 26, 2013, 2 pages.
State Intellectual Property Office of China, "First Notification of Office Action," issued in connection with Chinese Patent Application No. 201110294045.0, dated Sep. 26, 2013, 24 pages. (English translation included).
Japanese Patent Office, "Decision to Grant a Patent," issued in connection with Japanese Patent Application No. 2011-177687, dated Oct. 1, 2013, 5 pages. (English translation included).
United States Patent and Trademark Office, "Notice of Allowance," issued in U.S. Appl. No. 13/174,517 on Oct. 25, 2013, 2 pages.
United States Patent and Trademark Office, "Advisory Action," issued in connection with U.S. Appl. No. 12/856,643, dated Nov. 4, 2013, 2 pages.
Canadian Intellectual Property Office, "Examiner's Report," issued in connection with Canadian Patent Application No. 2,748,997, dated Nov. 21, 2023, 2 pages.
United States Patent and Trademark Office, "Pre-Brief Appeal Conference Decision," issued in connection with U.S. Appl. No. 12/856,651, dated Jan. 13, 2014, 2 pages.
State Intellectual Property Office of China, "Second Notification of Office Action," issued in connection with Chinese Patent Application No. 2011010294045.0, dated Apr. 3, 2014, 5 pages. (English translation included).
Canadian Intellectual Property Office, "Examiner's Report," issued in connection with Canadian Patent Application No. 2,781,018, dated Apr. 7, 2014, 3 pages.
United States Patent and Trademark Office, "Notice of Allowance," issued in connection with U.S. Appl. No. 12/856,643, dated Apr. 10, 2014, 14 Pages.
Australian Government, IP Australia, "Notice of Acceptance," issued in connection with AU Application No. 2011211444, issued on Apr. 29, 2014, 2 pages.
Australian Government, IP Australia, "Notice of Acceptance," issued in connection with AU Application No. 2012203829, issued on Jun. 12, 2014, 2 pages.
State Intellectual Property Office of China, "Notice of Allowance," issued in connection with Chinese Patent Application No. 201110294045.0, dated Jul. 4, 2014, 5 pages.
United States Patent and Trademark Office, "Notice of Allowance," issued in connection with U.S. Appl. No. 12/856,651, dated Jul. 7, 2014, 13 pages.
United States Patent and Trademark Office, "Notice of Allowance," issued in connection with U.S. Appl. No. 12/856,643, dated Aug. 5, 2014, 5 pages.
IP Australia, "Notice of Grant," issued in connection with Australian Patent Application No. 2011021444, dated Aug. 21, 2014, 2 pages.
IP Australia, "Notice of Grant," issued in connection with Australian Patent Application No. 2011211444, on Aug. 24, 2014, 2 pages.
International Searching Authority, "Written Opinion of the International Searching Authority," issued in connection with International Patent Application No. PCT/US2014/028176, dated Sep. 1, 2014, 6 pages.
International Searching Authority, "International Search Report," issued in connection with International Patent Application No. PCT/US2014/028176, dated Sep. 1, 2014, 3 pages.
The State Intellectual Property Office of People's Republic of China, "First Office Action," issued in connection with Chinese Patent Application No. 201210296506.2, dated Sep. 2, 2014, 19 Pages. (English translation included).
United States Patent and Trademark Office, "Notice of Allowance," issued in U.S. Appl. No. 12/856,651, mailed on Sep. 10, 2014, 2 pages.
United States Patent and Trademark Office, "Non-Final Action," issued in U.S. Appl. No. 13/840,594 on Sep. 19, 2014, 11 pages.
IP Australia, "Notice of Grant", issued in connection with Australian Patent Application No. 2012203829, dated Oct. 9, 2014, 1 page.
Canadian Intellectual Property Office, "Notice of Allowance," issued in connection with Canadian Patent Application No. 2,749,013, mailed Nov. 4, 2014, 1 page.
United States Patent and Trademark Office, "Final Action," issued in U.S. Appl. No. 13/840,594 on Mar. 11, 2015, 17 pages.
Canadian Intellectual Property Office, "Notice of Allowance," issued in connection with Canadian Patent Application No. 2,748,997, mailed Mar. 16, 2015, 1 page.
The State Intellectual Property Office of People's Republic of China, "Notice to Grant," issued in connection with Chinese Patent Application No. 201210296506.2, dated Mar. 18, 2015, 3 Pages. (English translation included).
Canadian Intellectual Property Office, "Notice of Allowance," issued in connection with Canadian Patent Application No. 2,781,018, mailed Apr. 16, 2015, 1 page.
United States Patent and Trademark Office, "Non-Final Office Action," issued in connection with U.S. Appl. No. 13/840,543 dated May 21, 2015, 15 pages.
United States Patent and Trademark Office, "Notice of Allowance," issued in connection with U.S. Appl. No. 13/840,594, dated May 26, 2015, 12 pages.
Australian Government, IP Australia, "Patent Examination Report No. 1," issued in connection with AU Application No. 2014210640, issued on May 27, 2015, 4 pages.

(56) References Cited

OTHER PUBLICATIONS

United States Patent and Trademark Office, "Non-Final Office Action," issued in connection with U.S. Appl. No. 14/041,613, dated Aug. 6, 2015, 9 Pages.
International Searching Authority, "International Preliminary Report on Patentability," issued in connection with International Patent Application No. PCT/US2014/028176, dated Sep. 15, 2015, 8 pages.
Canadian Intellectual Property Office, "Examiner's Report," issued in connection with Canadian Patent Application No. 2,749,013, dated Oct. 6, 2015, 4 pages.
Australian Government, IP Australia,"Patent Examination Report No. 1," issued in connection with AU Application No. 2014218363, issued on Nov. 6, 2015, 3 pages.
United States Patent and Trademark Office, "Notice of Allowance", issued in connection with U.S. Appl. No. 13/840,594, dated Nov. 17, 2015, 8 pages.
Canadian Intellectual Property Office, "Office Action," issued in connection with Canadian Patent Application No. 2,748,997, dated Nov. 24, 2015, 5 pages.
United States Patent and Trademark Office, "Notice of Allowance," issued in connection with U.S. Appl. No. 14/041,613, dated Nov. 25, 2015, 3 Pages.
United States Patent and Trademark Office, "Final Office Action," issued in connection with U.S. Appl. No. 13/840,543 dated Jan. 20, 2016, 17 pages.
European Patent Office, "Communication under Rule 71(EPC)" issued in connection with European patent application No. 12004911.9, Feb. 2, 2016, 8 pages.
European Patent Office, "Communication pursuant to Article 94(3) EPC," issued in connection with European patent application No. 11006706.3, Mar. 21, 2016, 9 pages.
European Patent Office, "Communication pursuant to Article 94(3) EPC," issued in connection with European patent application No. 11006705.5, Mar. 21, 2016, 7 pages.
United States Patent and Trademark Office, "Non-Final Office Action," issued in U.S. Appl. No. 14/537,488, mailed on Apr. 8, 2016, 14 pages.
Australian Government, IP Australia,"Notice of Acceptance," issued in connection with AU Application No. 2014210640, issued on May 2, 2016, 2 pages.
Australian Government, IP Australia,"Notice of Acceptance," issued in connection with AU Application No. 2014218363, issued on May 4, 2016, 2 pages.
European Patent Office, "Result of Consultation," issued in connection with European patent application No. 12004911.9, Jul. 6, 2016, 3 pages.
United States Patent and Trademark Office, "Non-Final Rejection," issued in connection with U.S. Appl. No. 14/537,484, dated Jul. 12, 2016, 6 Pages.
European Patent Office, "Communication under Rule 71(EPC)" issued in connection with European patent application No. 12004911.9, Jul. 14, 2016, 8 pages.
Canadian Intellectual Property Office, "Examiner's Report," issued in connection with Canadian Patent Application No. 2,749,013, dated Aug. 1, 2016, 5 pages.
United States Patent and Trademark Office, "Non-Final office action", issued in connection with U.S. Appl. No. 14/529,784, dated Aug. 5, 2016, 35 pages.
European Patent Office, "Decision to grant a European patent pursuant to Article 97(1) EPC," issued in connection with European patent application No. 12004911.9, Aug. 25, 2016, 2 pages.
Australian Government, IP Australia,"Notice of Grant," issued in connection with AU Application No. 2014218363, issued on Sep. 1, 2016, 1 page.
IP Australia, "Notice of Grant," issued in connection with Australian Patent Appl. No. 2014210640, dated Oct. 20, 2016, 1 page.
United States Patent and Trademark Office, "Final Office Action," issued in U.S. Appl. No. 14/537,488, mailed on Oct. 21, 2016, 18 pages.

United States Patent and Trademark Office, "Non-Final Office action", issued in connection with U.S. Appl. No. 13/840,543, dated Jan. 26, 2017, 53 pages.
United States Patent and Trademark Office, "Final Office Action," issued in connection with U.S. Appl. No. 14/529,784, dated Jan. 26, 2017, 21 pages.
United States Patent and Trademark Office, "Final Rejection," issued in connection with U.S. Appl. No. 14/537,484, dated Jan. 27, 2017, 8 Pages.
Canadian Intellectual Property Office, "Examiner's Report," issued in connection with Canadian Patent Application No. 2,748,997, dated Mar. 2, 2017, 5 pages.
Intellectual Property Office of China, "First Notification of Office Action," issued in connection with application No. 2014010432742.1 dated Mar. 29, 2017, 16 pages.
United States Patent and Trademark Office, "Notice of Allowance", issued in connection with U.S. Appl. No. 14/537,484, dated Apr. 13, 2017, 10 pages.
United States Patent and Trademark Office, "Notice of Allowance," issued in connection with U.S. Appl. No. 14/529,784, filed Apr. 26, 2017, 9 pages.
United States Patent and Trademark Office, "Pre-brief Appeal Conference Decision," issued in connection with U.S. Appl. No. 14/537,488, dated Jun. 7, 2017, 2 pages.
United States Patent and Trademark Office, "Non-Final Office Action," issued in U.S. Appl. No. 14/537,488, mailed on Jun. 30, 2017, 18 pages.
Intellectual Property of India, "Examination report under sections 12 & 13 of the Patents Act, 1970 and the Patents Rules, 2003," in connection with Indian Patent Application No. 2321/DEL/2011 , dated Jul. 17, 2017, 4 Pages.
Canadian Intellectual Property Office, "Examiner's Report," issued in connection with Canadian Patent Application No. 2,749,013, dated Jul. 24, 2017, 3 pages.
Intellectual Property of India, "Examination report under sections 12 & 13 of the Patents Act, 1970 and the Patents Rules, 2003," in connection with Indian Patent Application No. 2320/DEL/2011 , dated Aug. 29, 2017, 5 Pages.
The State Intellectual Property Office of People's Republic of China, "First Office Action," issued in connection with Chinese Patent Application No. 201510295455.5, dated Sep. 30, 2017, 15 Pages. [English translation included].
European Patent Office, "Communication Pursuant to Article 94(3) EPC," issued in connection with European Patent Application No. 11006705.5, on Nov. 6, 2017, 4 pages.
European Patent Office, "Communication pursuant to Article 94(3) EPC," issued in connection with European patent application No. 11006706.3, Nov. 6, 2017, 5 pages.
The State Intellectual Property Office of People's Republic of China, "Second Office Action," issued in connection with Chinese Patent Application No. 201410432742.1, dated Nov. 16, 2017, 15 Pages. (English translation included).
United States Patent and Trademark Office, "Non-Final Office Action" issued in connection with U.S. Appl. No. 13/840,543 dated Nov. 17, 2017, 26 pages.
United States Patent and Trademark Office, "Final Office Action," issued in connection with U.S. Appl. No. 14/537,488, on Jan. 19, 2018, 19 pages.
Canadian Intellectual Property Office, "Office Action," issued in connection with Canadian Patent Application No. 2,748,997, dated Feb. 19, 2018, 1 page.
United States Patent and Trademark Office, "Advisory Action," issued in connection with U.S. Appl. No. 14/537,488, dated Apr. 19, 2018, 8 pages.
The State Intellectual Property Office of People's Republic of China, "Third Office Action," issued in connection with Chinese Patent Application No. 201410432742.1, dated Apr. 23, 2018, 7 Pages. (English translation included).
Canadian Intellectual Property Office, "Examiner's Report," issued in connection with Canadian Patent Application No. 2,749,013, dated Jun. 4, 2018, 4 pages.

(56) References Cited

OTHER PUBLICATIONS

United States Patent and Trademark Office, "Non-Final Office Action," issued in U.S. Appl. No. 14/537,488, mailed on Jun. 28, 2018, 21 pages.
The State Intellectual Property Office of People's Republic of China, "Second Office Action," issued in connection with Chinese Patent Application No. 201510295455.5, dated Jul. 3, 2018, 13 Pages. [English translation included].
United States Patent and Trademark Office, "Non-Final Office Action", issued in connection with U.S. Appl. No. 15/700,883, on Aug. 14, 2018, 16 pages.
European Patent Office, "Communication pursuant to Article 94(3) EPC," issued in connection with European patent application No. 11006705.5, Aug. 24, 2018, 5 pages.
European Patent Office, "Communication pursuant to Article 94(3) EPC," issued in connection with European patent application No. 11006706.3, Sep. 10, 2018, 6 pages.
The State Intellectual Property Office of People's Republic of China, "Notice to Grant," issued in connection with Chinese Patent Application No. 201410432742.1, dated Oct. 9, 2018, 3 Pages. [English translation included].
United States Patent and Trademark Office, "Notice of Allowance", issued in connection with U.S. Appl. No. 15/700,883, filed Jan. 4, 2019, 5 pages.
United States Patent and Trademark Office, "Notice of Allowance," issued in connection with U.S. Appl. No. 14/537,488, dated Jan. 23, 2019, 8 pages.
The State Intellectual Property Office of People's Republic of China, "Notice to Grant," issued in connection with Chinese Patent Application No. 201510295455.5, dated Jan. 25, 2019, 3 Pages. [English translation included].
United States Patent and Trademark Office, "Notice of Allowance," issued in connection with U.S. Appl. No. 13/840,543, filed Feb. 28, 2019, 8 pages.
United States Patent and Trademark Office, "Notice of Allowance," issued in U.S. Appl. No. 14/537,488, mailed on Feb. 28, 2019, 2 pages.
European Patent Office, "Communication pursuant to Article 94(3) EPC," issued in connection with European patent application No. 11006705.5, Mar. 14, 2019, 4 pages.
Intellectual Property of India, "Examination report under sections 12 & 13 of the Patents Act, 1970 and the Patents Rules, 2003," issued in connection with Indian Patent Application No. 2010/DEL/2012, dated Mar. 19, 2019, 7 pages.
United States Patent and Trademark Office, "Notice of Allowability", issued in connection with U.S. Appl. No. 13/840,543 on Jun. 13, 2019, 3 pages.
Canadian Intellectual Property Office, "Examiner's Report," issued in connection with Canadian Patent Application No. 2,749,013, dated Jun. 17, 2019, 4 pages.
European Patent Office, "Communication under Rule 71(3) EPC," issued in connection with European patent application No. 11006706.3, Jul. 25, 2019, 7 pages.
United States Patent and Trademark Office, "Non-Final Office Action," issued in connection with U.S. Appl. No. 14/928,741, dated Sep. 20, 2019, 14 pages.
United States Patent and Trademark Office, "Non-Final Office Action," issued in U.S. Appl. No. 16/377,973, mailed on Nov. 12, 2019, 10 pages.
Intellectual Property of India, "Notice of Hearing," in connection with Indian Patent Application No. 2321/DEL/2011, dated Dec. 3, 2019, 3 Pages.
European Patent Office, "Decision to grant a European patent pursuant to Article 97(1) EPC," issued in connection with European patent application No. 11006706.3, Dec. 19, 2019, 2 pages.
Intellectual Property of India, "Decision," in connection with Indian Patent Application No. 2320/DEL/2011, dated Dec. 26, 2019, 8 Pages.
European Patent Office, "Intention to Grant Communication under rules 71(3) EPC," issued in connection with European patent application No. 11006705.5, Feb. 26, 2020, 8 pages.
European Patent Office, "European Search Report," issued in connection with European patent application No. 19219860.4, Apr. 14, 2020, 11 pages.
United States Patent and Trademark Office, "Final Office Action," issued in connection with U.S. Appl. No. 14/928,741, dated May 6, 2020, 11 pages.
United States Patent and Trademark Office, "Notice of Allowance," issued in U.S. Appl. No. 16/377,973, mailed on Jun. 4, 2020, 7 pages.
Intellectual Property of India, "Intimation of the grant and recordal of patent under section 43 of the Act," in connection with Indian Patent Application No. 2321/DEL/2011, dated Jun. 22, 2020, 1 Page.
Intellectual Property of India, "Decision," in connection with Indian Patent Application No. 2321/DEL/2011, dated Jun. 22, 2020, 1 page.
Canadian Intellectual Property Office, "Notice of Allowance," issued in connection with application No. 2,749,013, Sep. 9, 2020, 1 page.
United States Patent and Trademark Office, "Advisory Action", issued in connection with U.S. Appl. No. 14/928,741, dated Aug. 18, 2020, 3 pages.
European Patent Office, "Decision to grant a European patent pursuant to Article 97(1) EPC," issued in connection with European patent application No. 11006705.5, Sep. 10, 2020, 2 pages.
United States Patent and Trademark Office, "Notice of Allowance," issued in connection with U.S. Appl. No. 16/436,742, dated Nov. 18, 2020, 9 Pages.
European Patent Office, "European Search Report," issued in connection with European patent application No. 20196396.4, Dec. 18, 2020, 11 pages.
United States Patent and Trademark Office, "Non-Final Action" issued in U.S. Appl. No. 16/511,780 on Jan. 29, 2021, 14 pages.
United States Patent and Trademark Office, "Corrected Notice of Allowance," issued in connection with U.S. Appl. No. 16/436,742, filed Feb. 1, 2021, 2 pages.
United States Patent and Trademark Office, "Corrected Notice of Allowance", issued in connection with U.S. Appl. No. 16/436,742, dated Feb. 12, 2021, 2 pages.
United States Patent and Trademark Office, "Non-Final Office Action," issued in connection with U.S. Appl. No. 14/928,741, filed Mar. 8, 2021, 13 pages.
United States Patent and Trademark Office, "Non-Final Office Action," issued in U.S. Appl. No. 17/063,652, mailed on Apr. 12, 2021, 13 pages.
United States Patent and Trademark Office, "Non-Final Office Action," issued in U.S. Appl. No. 17/063,652, mailed on Aug. 2, 2021, 4 pages.
United States Patent and Trademark Office, "Final Office Action," issued in connection with U.S. Appl. No. 16/511,780, dated Aug. 11, 2021, 14 Pages.
United States Patent and Trademark Office, "Final Office Action," issued in connection with U.S. Appl. No. 14/928,741, dated Oct. 28, 2021, 17 pages.
United States Patent and Trademark Office, "Notice of Allowance," issued in U.S. Appl. No. 17/063,652, mailed on Nov. 16, 2021, 7 pages.
Canadian Patent Office, "Office Action and Examination Search Report," issued in connection with Canadian Patent Application No. 3,093,770, dated Nov. 25, 2021, 4 pages.
European Patent Office, "Communication pursuant to Article 94(3) EPC," issued in connection with European Patent Application 19219860.4-1218, dated Jan. 4, 2022, 6 pages.
United States Patent and Trademark Office, "Notice of Allowance," issued in connection with U.S. Appl. No. 16/511,780, dated Mar. 2, 2022, 8 Pages.
United States Patent and Trademark Office, "Notice of Allowance," issued in U.S. Appl. No. 17/063,652, mailed on Mar. 23, 2022, 7 pages.

(56) References Cited

OTHER PUBLICATIONS

United States Patent and Trademark Office, "Notice of Allowance," issued in connection with U.S. Appl. No. 14/928,741, dated Apr. 13, 2022, 24 pages.
United States Patent and Trademark Office, "Notice of Allowance," issued in U.S. Appl. No. 17/214,765 on Apr. 18, 2022, 12 pages.
United States Patent and Trademark Office, "Notice of Allowance," issued in connection with U.S. Appl. No. 16/511,780, dated Jul. 20, 2022, 10 Pages.
United States Patent and Trademark Office, "Non-Final Office Action," issued in connection with U.S. Appl. No. 17/850,910, dated Oct. 13, 2022, 15 Pages.
Canadian Intellectual Property Office, "Examiner's Report," issued in connection with Canadian Patent Application No. 3,093,770, dated Oct. 31, 2022, 3 pages.
United States Patent and Trademark Office, "Notice of Allowance," issued in U.S. Appl. No. 17/850,910 on Jan. 23, 2023, 7 pages.
United States Patent and Trademark Office, "Corrected Notice of Allowance," issued in connection with U.S. Appl. No. 17/850,910, mailed on Feb. 1, 2023, 2 pages.
United States Patent and Trademark Office, "Non-Final Office Action," in connection with U.S. Appl. No. 17/902,640, issued Mar. 16, 2023, 13 pages.
United States Patent and Trademark Office, "Non-Final Office Action," issued in connection with U.S. Appl. No. 18/057,646, dated May 11, 2023, 22 Pages.
Intellectual Property of India, "Intimation of grant and recordal of patent under section 43 of the Act," issued in connection with Indian Patent Application No. 2010/DEL/2012, dated Jun. 1, 2023, 1 page.
United States Patent and Trademark Office, "Notice of Allowance," issued in connection with U.S. Appl. No. 17/902,640, dated Jul. 13, 2023, 8 Pages.
Canadian Patent Office, "Notice of Allowance," issued in connection with Canadian Patent Appl. No. 3,093,770, dated Aug. 14, 2023, 1 page.
European Patent Office, "Communication pursuant to Article 94(3) EPC," issued in connection with European Patent Application No. 20196396.4-1218, mailed on Aug. 17, 2023, 6 Pages.

* cited by examiner

| DEVICE ID | SRC. PORT | DEST. PORT | TIMESTAMP | HTTP REQUEST |
|---|---|---|---|---|
| cPhone 5x | 54806 | 50000 | 6:00:00 PM | GET http://app.sportsapp.com/home.html HTTP/1.1<br>Host: proxy.MonitoringEntity.com:50000<br>User-Agent: <SportsApp/5.1 mOS/6.2 ARNet/41.3.7/> |
| cPhone 5x | 54817 | 50000 | 6:01:23 PM | GET http://app.sportsapp.com/article1.html HTTP/1.1<br>Host: proxy.MonitoringEntity.com:50000<br>User-Agent: <SportsApp/5.1 mOS/6.2 ARNet/41.3.7/> |
| cPhone 5x | 54800 | 50000 | 6:04:43 PM | GET http://ad.seatspot.com/ HTTP/1.1<br>Host: proxy.MonitoringEntity.com:50000<br>User-Agent: <EmbAd/1.1 ARNet/9.14.7/> |
| cPhone 5x | 54850 | 50000 | 6:15:39 PM | GET https://api.twitter.com/user_timeline.rss<br>Host: proxy.MonitoringEntity.com:50000<br>User-Agent: <Twitter-cPhone/5.3 mOS/6.1(cPhone5x)/> |
| cPhone 5x | 54863 | 50000 | 6:17:42 PM | GET http://bannerad.net/ad1.html HTTP/1.1<br>Host: proxy.MonitoringEntity.com:50000<br>User-Agent: <EmbAd/1.1 ARNet/9.14.7/> |
| cPhone 5x | 54869 | 50000 | 6:27:57 PM | GET https://api.twitter.com/user_timeline.rss<br>Host: proxy.MonitoringEntity.com:50000<br>User-Agent: <Twitter-cPhone/5.3 mOS/6.1(cPhone5x)/> |
| ... | ... | ... | ... | ... |

FIG. 3

METHODS AND APPARATUS TO IMPROVE USAGE CREDITING IN MOBILE DEVICES

CROSS-REFERENCE TO RELATED APPLICATIONS

This patent arises from a continuation of U.S. patent application Ser. No. 17/850,910, filed on Jun. 27, 2022, now U.S. Pat. No. 11,671,511, which is a continuation of U.S. patent application Ser. No. 17/063,652, filed on Oct. 5, 2020, now U.S. Pat. No. 11,418,610, which is a continuation of U.S. patent application Ser. No. 16/377,973, filed Apr. 8, 2019, now U.S. Pat. No. 10,798,192, which is a continuation of U.S. patent application Ser. No. 15/700,883, filed Sep. 11, 2017, now U.S. Pat. No. 10,257,297, which is a continuation of U.S. patent application Ser. No. 14/529,784, filed Oct. 31, 2014, now U.S. Pat. No. 9,762,688. U.S. patent application Ser. No. 17/850,910, U.S. patent application Ser. No. 17/063,652, U.S. patent application Ser. No. 16/377,973, U.S. patent application Ser. No. 15/700,883, and U.S. patent application Ser. No. 14/529,784 are hereby incorporated herein by reference in their respective entireties.

FIELD OF THE DISCLOSURE

This disclosure relates generally to media monitoring, and, more particularly, to improving usage crediting in mobile devices.

BACKGROUND

In recent years, mobile devices have become ubiquitous to daily life for quickly accessing Internet based media. For example, it is becoming increasingly rare to come across someone not using a mobile device to access media on demand. Recently, such devices have become capable of utilizing applications not designed solely for browsing the Internet to access Internet based media.

BRIEF DESCRIPTION OF THE DRAWINGS

FIG. 3 is an example illustration of a proxy log from the proxy server of FIG. 1.

DETAILED DESCRIPTION

Figure 1:
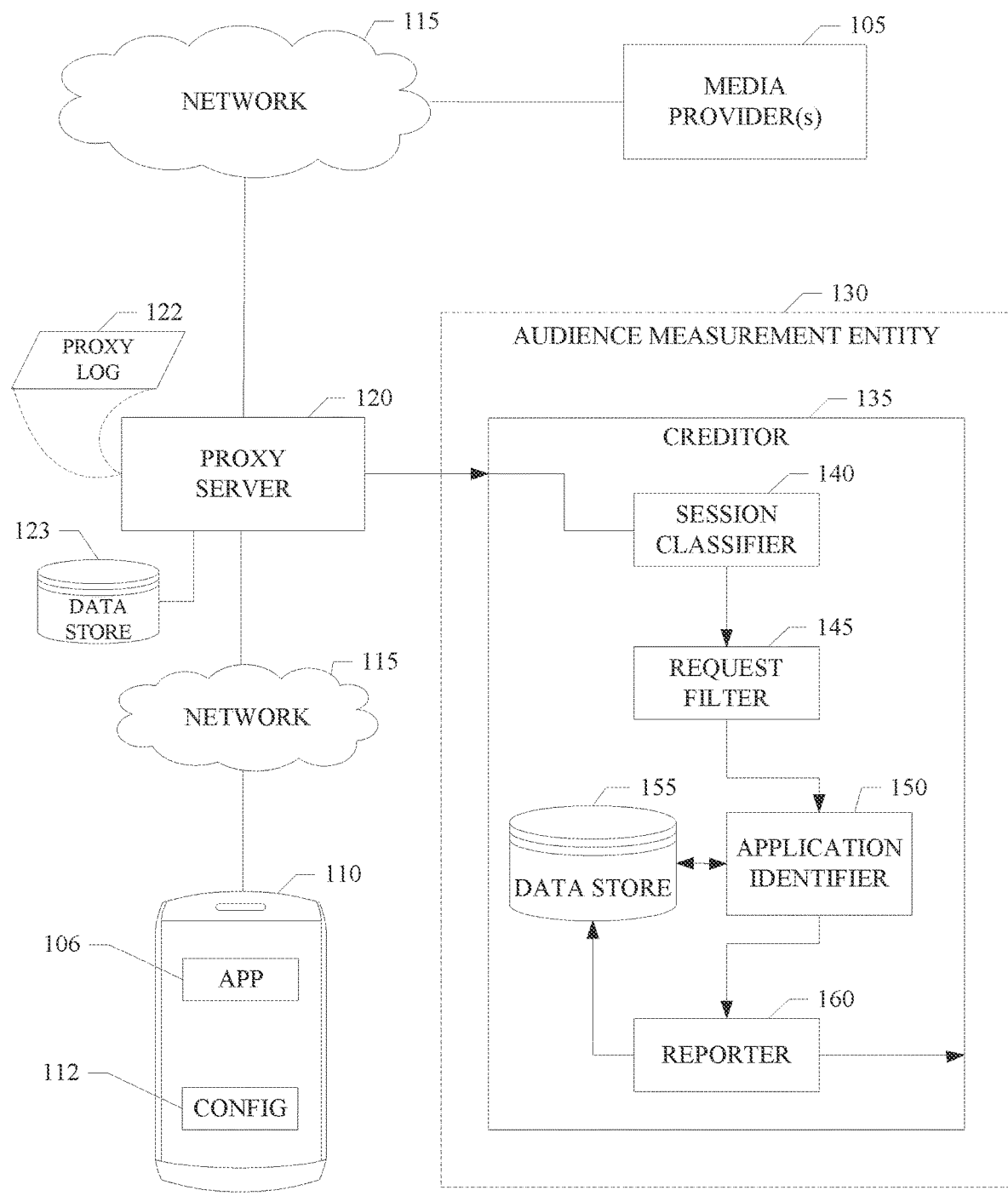
FIG. 1 is a block diagram of an example system constructed in accordance with the teachings of this disclosure to improve usage crediting in mobile devices.

Monitoring companies desire to gain knowledge on how users interact with mobile devices such as, for example, a smartphones. For example, monitoring companies want to monitor Internet traffic to and/or from the mobile devices to, among other things, monitor exposure to advertisements, determine advertisement effectiveness, determine user behavior, identify purchasing behavior associated with various demographics, credit application usage, etc. Examples disclosed herein facilitate such monitoring at a proxy server.

Examples disclosed herein identify applications with which hypertext transfer protocol (HTTP) messages received at a proxy server are associated. In examples disclosed herein, requests associated with browser and/or media presentation application traffic (e.g., HTTP requests) received at a proxy server are grouped into sessions based on the port numbers of these requests. In further examples disclosed herein, the sessions are classified as associated with a specific application using user agent data contained in the requests.

In examples disclosed herein, HTTP requests routed through a proxy server are processed to extract data and/or metadata associated with the transmission of the HTTP request. Accordingly, data and/or metadata from each HTTP request are recorded into a proxy log and are associated with a user corresponding to the destination port number. Such extracted data and/or metadata may be, for example, a source port, a destination port, a Universal Resource Locator (URL), a user agent, a media type, a timestamp, etc. The proxy log may be subsequently used to credit the usage of the applications executing on the device.

When a mobile device makes a request for media, the mobile device sends a request using an HTTP protocol. Each HTTP request (and corresponding response) that originates at the device is associated with two ports: the source port (e.g., a port on the mobile device) and destination port (e.g., a port on the proxy server). The ports are numbers (typically from 0 to 65535) contained in the header of the packet (e.g., Transmission Control Protocol (TCP), User Datagram Protocol (UDP), etc.) containing the request used to further route traffic beyond the Internet protocol (IP) address. The port number is used in conjunction with an Internet Protocol (IP) address to identify, route, and receive data on a device connected to a packet switched network (e.g., the Internet). Certain ports are not available for use if those ports are associated with other Internet services. For example, ports 0 through 1023 are defined as Well Known Ports by the Internet Assigned Numbers Authority (IANA), and are prohibited from use without IANA registration.

In some examples, an assigned port for communication may be an ephemeral port that is allocated and valid for use only for the duration of a communication session for which it is utilized. When the communication session is completed and/or terminated, the ephemeral port is free to be reused at the discretion of the device (e.g., a mobile device and/or a server). Source and/or Destination ports may be ephemeral.

For example, data to be forwarded to a particular application on a device will be transmitted to the IP address of the device (e.g., 192.168.1.2) and will include a port number. For example, the device forwarding the data assigns the port number in a predefined range designated for application specific communication. After the data is received at the designated IP address, the data is further routed at the device to an application (and/or application process) associated with the data using the specified port number. In some examples, an application executing on a device use process-specific ports to properly and efficiently make use of network connectivity. As further requests are generated and fulfilled, the existing ports may "close" (e.g., cease to be used) and subsequent ports having higher or lower numbers will open (e.g., a new number will be used). Additionally or alternatively, some closed ports may be reused for other processes to conserve port numbers.

An HTTP request may include a user agent field. A user agent field in an HTTP request may contain information about an application generating the request (e.g., Firefox™, Twitter™, etc.), an operating system version of the device the request originated from (e.g., iOS™ 7), a hardware version of the device transmitting a request (e.g., iPhone 5S), a rendering platform used by the application (e.g., WebKit, Gecko, etc.), and/or abilities of the versions of the application generating the request (e.g., LiveMeeting, etc.).

Example user agent data originating from the mobile Twitter™ application may be populated according to the following: "Twitter-iPhone/3.5.1 iOS/6.0." The portion, "Twitter-iPhone/3.5.1" designates that the application making the HTTP request is version 3.5.1 of the Twitter™ iPhone application. The portion, "iOS/6.0" indicates that the operating system of the device making the HTTP request is iOS™ version 6.0.

In examples disclosed herein, a device monitored using a proxy server transmits requests using a destination port number that identifies the device sending the traffic and, in extension, the actual user with that device. For example, when configuring the device for monitoring, a unique destination port number is assigned to each panelist for transmitting requests to the proxy server provided by a monitoring company (e.g., The Nielsen Company (US), LLC.). In such an example, the destination port/panelist association is stored at the proxy device. In other examples the destination port/panelist association is stored at a monitoring company. All traffic routed through the proxy server for a particular user will be identifiable by (and associated with) the destination port number. Example systems, methods, and apparatus for configuring a mobile device to interact with a proxy are disclosed in U.S. patent application Ser. Nos. 12/856,651, 12/856,643, 13/174,517, each of which is hereby incorporated by reference in its entirety.

Additionally, an HTTP request transmitted from a mobile device contain a source port number associated with an applications and/or application process that is making the request. The source port numbers may be assigned by the device or they may be requested by, or registered to, the application making the HTTP request. For example, when an application launches (or becomes active after a period of suspension) on a mobile device, an initial block of HTTP requests within a range of port numbers (e.g., a range comprising ten ports, a range comprising fifty ports, etc.) are transmitted to a server. Typically, this range of ports is sufficient for all activity associated with the application until closing or being suspended. In some examples, the HTTP requests are all associated with the application. In other examples, the HTTP requests are associated with the application and processes associated with the application. For example, other applications or processes integrated with other applications (e.g., the ability to use the email application of the mobile device, advertisement retrieval, etc.) may generate HTTP requests within this range.

As an application executes, additional HTTP requests outside of the initial block of requests may be sent based on user interaction with the application (e.g., un-common processes, extended usage, advertisement retrieval, etc.). For example, if each of the ports in the initial range is in use, or not released for subsequent use, an application may generate a new HTTP request on a port outside the initial block of requests (e.g., the initial range of ports). To this end, the initial block of requests changes to a current block of requests. That is, as requests outside the initial block are generated, the initial block of request becomes a current range including a highest port number and a lowest port number. Each HTTP request made by the application (or processes associated with the application, such as advertisement retrieval, for example) outside of the initial range is typically within fifteen ports of the highest and/or lowest value of the current range. When a new browser and/or media presentation application is launched on the mobile device, a jump of at least fifteen ports is observed in the associated traffic at the proxy server. Using this characteristic, traffic associated with a user at a proxy server may be grouped into sessions that represent application-specific traffic by processing the source port numbers of records in a proxy log.

In examples disclosed herein, when HTTP requests are grouped, a session identification may be associated to the each record in the proxy log. The session identification is a unique alphanumeric identifier added to records that are determined to belong to the same session. For every identified session (e.g., grouping) of HTTP requests in the proxy log, a new session identification is created and associated to the corresponding requests.

After grouping the HTTP requests into sessions, wildcarded search strings of the user agents in the requests are used to identify what application is associated with the corresponding records in the proxy log. That is, the numeric values of the user agents are replaced with a character or group of characters that act as wildcard replacements (e.g., "% D") in the search string. Alternatively, the URLs of the HTTP request may have portions of the URL wildcarded with string-indicative wildcards (e.g., "% S"). This prevents a large number of parallel classifications. For example, a fifth release of a sports application (e.g., "SportsApp/5.0") executing on the sixth iteration of an operating system (e.g., "mOS/6.0") may produce a large number of different user agents through combination of all previous iterations (e.g., "SportsApp/x.0 mOS/x.0"). By removing the version numbers, only one user agent would be a valid match indicating the application (e.g., "SportsApp/% D mOS/% D").

The individual sessions are classified using the wildcarded user agent search string. The HTTP requests in the proxy log are accessed by session and each session classified. In classification, the records in each session are compared to dynamic rules which are used to identify to which application this session belongs. Using logical rules, these sessions are classified and the usage is attributed to a corresponding application.

Some applications utilize protocols other than HTTP such as, for example, HTTP Secure (HTTPS). Accordingly, while the examples disclosed herein are described with reference to the HTTP protocol, any other past, present, and/or future protocol and/or format of communication may additionally or alternatively be used such as, for example, HTTP secure (HTTPS), File Transfer Protocol (FTP), etc.

FIG. 1 is a block diagram of an example environment in which example methods apparatus and/or articles of manufacture disclosed herein may be used for crediting application usage. In the example environment of FIG. 1, data is transmitted from a media provider 105 to an example application 106 executing on example mobile device 110. The transmission of data in the illustrated example FIG. 1 is performed through an example proxy server 120 capable of storing data in an example data store 123. The example environment includes the example mobile device 110, the proxy server 120, the media provider 105, and an example creditor 135. In the example of FIG. 1, an audience measurement entity 130, such as The Nielsen Company (US), LLC, operates an example creditor 135 to credit application usage.

In the illustrated example, the mobile device 110 is associated with a panelist who has agreed to be monitored by the audience measurement entity 130. Panelists are users registered on panels maintained by a ratings entity (e.g., the audience measurement entity 130) that owns and/or operates the creditor 135. Traditionally, audience measurement entities (also referred to herein as "ratings entities") determine demographic reach for advertising and media programming based on registered panel members. That is, an audience measurement entity 130 enrolls people that consent to being monitored into a panel. During enrollment, the audience measurement entity 130 receives demographic information from the enrolling people so that subsequent correlations may be made between advertisement/media exposure to those panelists and different demographic markets.

People become panelists via, for example, a user interface presented on the mobile device 110. People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.).

In the panelist system of the illustrated example of FIG. 1, consent is obtained from the user to monitor and/or analyze network data when the user joins and/or registers for the panel. For example, the panelist may agree to have their Internet traffic of the mobile device monitored by the proxy server 120. Although the example system of FIG. 1 is a panelist-based system, non-panelist and/or hybrid panelist systems may additionally and/or alternatively be employed. The example mobile device 110 communicates with the example media provider 105 via the proxy server 120 using the network 115.

The example network 115 may be any type of communications network, (e.g., the Internet, a local area network, a wide area network, a cellular data network, etc.) facilitated by a wired and/or wireless connection (e.g., a cable/DSL/satellite modem, a cell tower, etc.). The example network may be a local area network, a wide area network, or any combination of networks.

Upon enrollment, the panelist and/or mobile device (e.g., the mobile device 110) are assigned configuration information 112 including a unique destination port number to route Internet traffic through at an Internet Protocol (IP) address of the proxy server 120, for example. Using the mobile device 115 according to the configuration information 112 allows the Internet traffic to be attributed to the panelist and/or the mobile device 110.

In the illustrated example, the example mobile device 110 generates HTTP requests to transmit to the media provider 105 to obtain data. The HTTP requests are routed, based on the configuration information 112, through the example proxy server 120 at the unique destination port. The example proxy server 120 extracts (or replicates) data and/or metadata from the HTTP request and stores the request in a record of a proxy log 122 associated with the unique destination port number. For example, the example proxy server 120 extracts a timestamp of the request, a source port, a destination port, a user agent, and URL from the HTTP request.

When the data and/or metadata has been extracted, the example proxy server 120 routes the HTTP request to the example media provider 105 which acknowledges the request and returns the data to the example mobile device 110 through the example proxy server 120. The proxy log 122 is transmitted to the audience measurement entity 130 by the example proxy server 120. In some examples the proxy log 122 is transmitted in a periodic fashion (e.g., hourly, daily, weekly, etc.), in other examples, the proxy log 122 is transmitted in an aperiodic fashion (e.g., on request, when certain conditions are met, etc.).

In the illustrated example, the HTTP requests are transmitted using the Transmission Control Protocol and/or the User Datagram Protocol. However, any past, present, and/or future protocol may be utilized in the illustrated environment 100 providing that such protocols transmit port information and user agent data.

The example mobile device 110 of FIG. 1 is a handheld mobile device. While in the illustrated example the mobile device 110 is shown as a cellular phone, any other type of device may be used. For example, other types of phones (e.g., an Apple® iPhone®), a laptop computer, a desktop computer, a personal digital assistant (PDA), a netbook, or a tablet computer (e.g., an Apple® iPad™) may additionally or alternatively be used. The mobile device 110 may be implemented with any mobile operating system, and may be implemented with any type of hardware and/or form factor. In the illustrated example, the mobile device 110 communicates via a wireless interface. However, any other type(s) of communication interface may additionally or alternatively be used such as, for example, an Ethernet connection, a Bluetooth connection, a Wi-Fi connection, a cellular connection (e.g., a Time Division Multiple Access (TDMA) connection, Code Division Multiple Access (CDMA) connection, Worldwide Interoperability for Microwave Access (WiMAX) connection, Long Term Evolution (LTE) connection, etc.).

The example proxy server 120 of the illustrated example is a network device located in a separate location from a monitored household that acts as an intermediary for communications (e.g., HTTP requests and responses) involving the example mobile device 110. Alternatively, the example proxy server 120 may be located in the monitored household. For example, the example proxy server 120 may be a router, a gateway, a server, and/or any device capable of acting as a network traffic intermediary. For example, a broadband modem and/or router may implement the proxy server 120. According to the illustrated example, the proxy server 120 is an intermediary for communications between the example mobile device 110 and the example media provider 105.

The example proxy server 120 is involved in communications associated with the example mobile device 110 and therefore, the example proxy server 120 is capable of gathering information about those communications. The proxy server 120 may not perform functions typically associated with a proxy (e.g., performing packet translation). Rather, the functions of the proxy server 105 described in examples herein, may be performed by any type of device to collect information about communications between the example mobile device 110 and the example media provider 105 (e.g., the example proxy server 120 may not participate in the communication chain and, instead, may monitor the communications from the sidelines using, for example, packet mirroring, packet snooping, or any other technique).

In the illustrated example of FIG. 1, the proxy server 120 receives requests from the mobile device 110. The requests of the mobile device 110 are received by the proxy server 120 based on configuration information 112 (e.g., the proxy server address, the unique destination port number, a username, a password, etc.) provided to the panelist and/or mobile device 110. The configuration information 112 causes the mobile device 110 to transmit all subsequent requests through the proxy server 120.

The proxy server 120 retrieves the requested data from the media provider 105 (or from a local cache if, for example, the media has previously been requested and stored). As disclosed above, to identify the panelist associated with the request, communication to and from each specific panelist occurs over the uniquely assigned (e.g., dedicated) port. Thus, each panelist is assigned a unique port and no other panelist communicates via that port. In some examples multiple proxy servers are used to expand the number of panelists and/or devices supported by the monitoring system. In such examples the proxy server address and port number combination is uniquely assigned to the panelists and/or devices. In some examples, each panelist/device pair is assigned a unique port number to facilitate differentiation between usage of a first device (e.g., a phone) by a panelist and usage of a second device (e.g., an iPad) by the same panelist.

While the communication between a mobile device 110 and the proxy server 120 occurs over a single port, communication between the proxy server 120 and the media providers 105 may be implemented over any port. After retrieving the requested data from the media provider 105, in the illustrated example the data is relayed to the requesting mobile device 110 via the port assigned to the mobile device.

In the example FIG. 1, the proxy log 122 is transmitted from the example proxy server 120 to the example creditor 135 of the example audience measurement entity 130. At the example creditor 135, the proxy log 122 is processed to generate groupings (e.g., sessions) of the records based on the originating port numbers of the requests. The records in each session are compared to example model user agents. If a session is determined by the example creditor 135 as indicative of a certain application, the session is classified as belonging to the certain application. Accordingly, the session usage is credited to the certain application. If the session is unable to be classified by the example creditor 135 (e.g., not determined to match a model user agent), the session is stored so that classification may be attempted at a later time (e.g., when more example user agents have been gathered by the example creditor 135 and/or provided to the system).

The example creditor 135 of FIG. 1 is provided with an example session classifier 140, an example request filter 145, an example application identifier 150, an example data store 155, and an example reporter 160.

The example session classifier 140 of FIG. 1 obtains the proxy log 122 from the example proxy server 120. The example session classifier 140 groups the records of the proxy log 122 into sessions using the source port identified in the record of the proxy log 122 as illustrated in greater detail in FIGS. 4A-4F. In some examples, the example session classifier 140 adds (e.g., appends, prepends, inserts, etc.) a session identifier to the user agent of the request. The session identifier may be an alphanumeric string, a hexadecimal value, or any other representative value. In the example FIG. 1, the example session classifier 140 is in communication with the request filter 145.

The example request filter 145 accesses the sessioned proxy log 122 from the example session classifier 140 to generate search strings having the numerical values from user agent data filtered out via wildcarding. That is, by generating user agent search strings deficient of, for example, version values, the example request filter 145 generates user agent search strings capable of identifying application traffic irrespective of application version. For example, the example request filter 145 replaces the numerical values occurring after forward slashes in the user agent with wildcarded characters. As disclosed earlier, user agent data contains indentifying information regarding the application (and application version) generating the HTTP request. Because applications are not uniformly updated across all devices, many different versions may be used on an according amount of devices. Accordingly, wildcards (e.g., "% D") are used when filtering the user agents to enable accurate identification of the originating application regardless of the version of the application. This has the effect of condensing several possible session identifications of different versions of the same application into a uniform session identification for the application regardless of version. In the illustrated example of FIG. 1, the example request filter 145 generates a search string, which is a wildcarded user agent, by obtaining the user agent and replacing the numeric values in the user agent string with "% D". Of course any such replacement character or group of characters may be implemented to act as the wildcarded character.

The example application identifier 150 of the illustrated example classifies the sessions identified by the example session classifier 140 using the filtered records of the session provided by the request filter 145. In the illustrated example, Boolean logic (e.g., AND, OR, etc.) associated with application model user agents (e.g., an expected wildcarded user agent associated with a corresponding application) is applied to each of the records in the session. For example, the application identifier 150 accesses each identified session and analyzes the records in the identified session against logical expressions indicative of originating applications stored in the example data store 155 until a match is found. For example, URL patterns are used to identify the originating application.

In some examples, user agents employed by certain applications are generic and, therefore, do not point to a specific application making the requests in the session. For example, the user agent utilized by a streaming media application may use a generic browser user agent. In these particular examples, when a user agent is not indicative of an application, the URLs of the HTTP requests in the session are analyzed by the application identifier 150 in the same way as the user agents are analyzed above.

In the illustrated example, the example reporter 160 reports the identified sessions to the data store 155 and/or an external actor at the audience measurement entity 130. The example reporter 160 also credits the application identified by the example application identifier 150 with a usage duration of the session. For example, the identified application is credited for exposure to the panelist associated with the destination port. If a session is unable to be classified, the example reporter 160 tags the session for a later attempt at classification by the application session identifier 150. In some examples, the example reporter 160 presents a group of unclassified sessions having matching application model user agents and/or URLs for external classification. In other examples, the group of unclassified sessions may be preliminarily classified by the example application session identifier 150 and reported externally by the example reporter 160 for approval.

In some examples, the example reporter 160 extracts the unidentified session records into a discrete file that is placed in an auxiliary classification queue. In some such examples, the auxiliary classification queue may be accessed at a later time when additional application model user agents and/or URLs have been added to the data store 155 for use in classification.

While an example manner of implementing the example creditor 135 of FIG. 1 is illustrated in FIG. 1, one or more of the elements, processes and/or devices illustrated in FIG. 1 may be combined, divided, re-arranged, omitted, eliminated and/or implemented in any other way. Further, the example session classifier 140, the example request filer 145, the example application identifier 150, the example data store 155, the example reporter 160 and/or, more generally, the example creditor 135 of FIG. 1 may be implemented by hardware, software, firmware and/or any combination of hardware, software and/or firmware. Thus, for example, any of the example session classifier 140, the example request filer 145, the example application identifier 150, the example data store 155, the example reporter 160 and/or, more generally, the example creditor 135 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example session classifier 140, the example request filer 145, the example application identifier 150, the example data store 155, the example reporter 160 and/or, more generally, the example creditor 135 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example creditor 135 of FIG. 1 may include one or more elements, processes and/or devices in addition to, or instead of, those illustrated in FIG. 1, and/or may include more than one of any or all of the illustrated elements, processes and devices.

Figure 2:
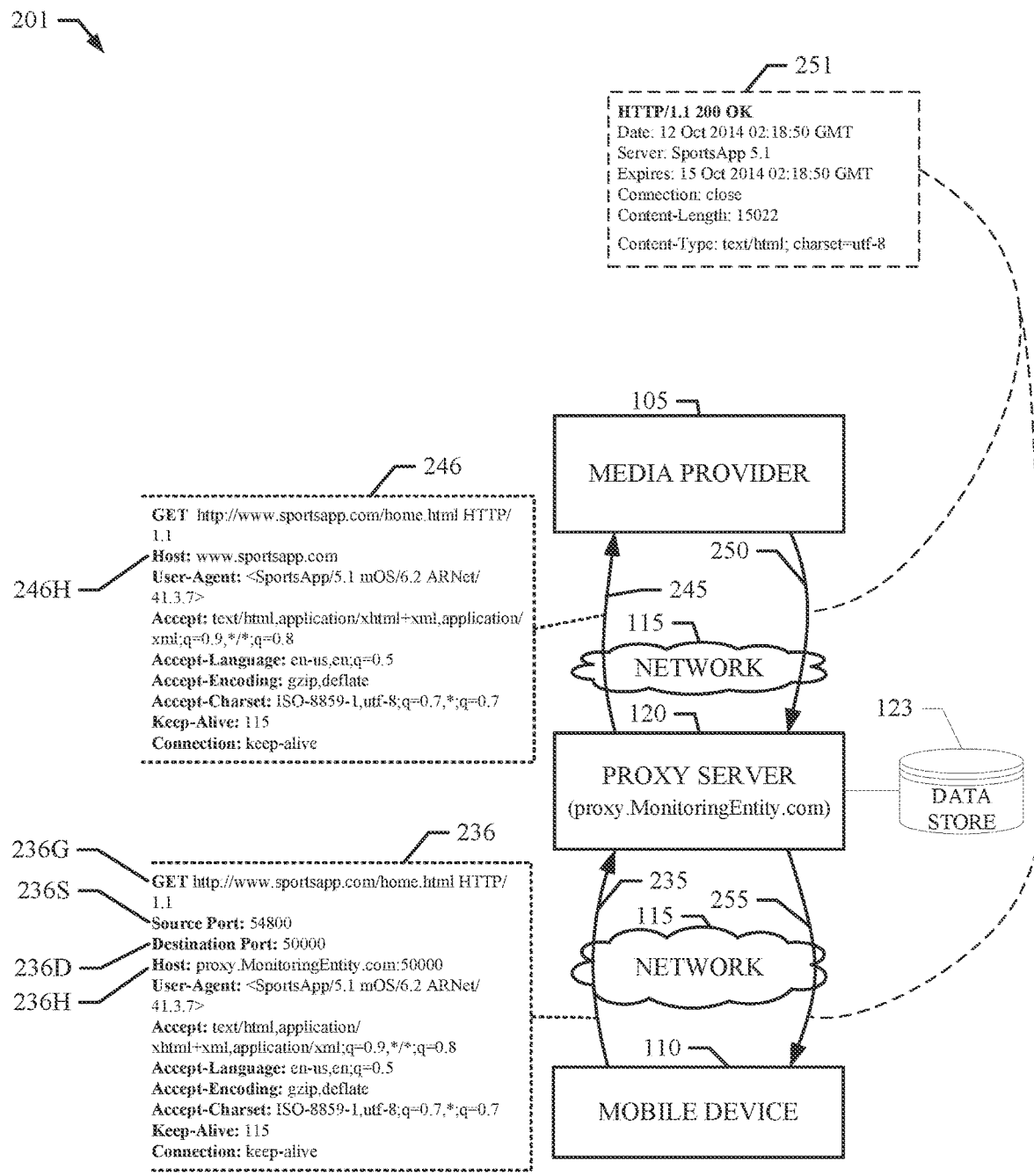
FIG. 2 is a block diagram illustrating an example HTTP request flowing through the example system of FIG. 1.

FIG. 2 is a block diagram 201 illustrating an example request and response flow through the example system of FIG. 1. The block diagram 201 includes the proxy server 120 and the proxy server data store 123, the media provider 105, the mobile device 110, and network 115. The block diagram 201 additionally includes a first request 235, a second request 245, a first response 250, and a second response 255. Further, the requests are represented by HTTP request headers. The first request 235 is represented by the first HTTP request header 236 and the second request 245 is represented by the second HTTP request header 246.

The first request 235 originates from the example mobile device 110 as a request for media from a media provider 105 in response to user interaction with an application on the mobile device 110. The first request 235 is transmitted to the proxy server 120 via the example network 115. The proxy server 120 communicates with the media provider 105 via a second request 245. The second request 245 is sent from the proxy server 120 to the media provider 105 on behalf of the mobile device 110. The media provider 105 responds to the second request 245 with a message to the proxy server 120 (e.g., response 251). The response 251 is transmitted to the corresponding mobile device 110.

The first HTTP request header 236 is the header of a GET request (e.g., 236G) generated by the mobile device 110. In the illustrated example, the media provider 105 is identified by the absolute URL identified in the first line of the first HTTP request header 236 and the address of the proxy 115 and uniquely assigned port are identified by the "Host" line 236H of the first HTTP request header 236. The first request is identified as originating from source port 236S 54800 on the mobile device 110. The host identified in the illustrated example 236H is proxy.MonitoringEntity.com, and the destination port 236D that the request was made to is 50000. However, any other address identifying the proxy server 120 and any other port may alternatively be used. For example, the address identifying the proxy 115 may be the Internet Protocol (IP) address of the proxy 115. In the illustrated example, the absolute URL of the Internet resource is "http://www.sportsapp.com/home.html." However, any other URL may additionally or alternatively be used.

The proxy 115 receives the first media request 235 and generates the second media request 245. The second media request 245 is represented by the second HTTP request header 246. In the illustrated example, the second HTTP request header 246 is a GET request directed to host 246H "http://www.sportsapp.com." The media being requested from host 246H "http://www.sportsapp.com" in the illustrated example is "/home.html." The proxy server 120 generates the second request by inspecting the first request 235. For example, the proxy server 120 identifies the requested media of the first request 235 as "http://www.sportsapp.com/home.html," determines that the media provider 105 identified is "www.sportsapp.com," and determines that the requested webpage from the media provider is "/home.html."

In some examples, the media identified by a first media request 235 may be media that is provided on a port other than the default communication port. (e.g., port 80). For example, the mobile device 110 may seek to request media that is hosted on port 1234, rather than the default port (e.g., port 80 which is the default standard port for HTTP content). In such an example, an absolute URL of a first HTTP request header identifies the requested media as "http://www.sportsapp.com:1234/home.html," to convey that the media identified by the request is provided on port 1234 (rather than the default port). Further, in such an example, the proxy server 120 generates a second HTTP request header that identifies port 1234 (e.g., www.sportsapp.com:1234).

The media provider 105 receives the second media request 245, and responds to the request via the first response 250 that is sent to the proxy server 120. The proxy server 120 receives the first response 250, and determines the correct port over which the second response 255 should be transmitted to reach the mobile device 110. The proxy server 120 can identify that the first request 235 was received on port 50000, and thus, the second response 255 should be transmitted on port 50000. However, any other method of determining the port to transmit the second response over may additionally or alternatively be used. Further, the response may be transmitted over a port other than the port assigned to the mobile device 110.

FIG. 3 is an example proxy log 122 table illustrating HTTP requests recorded at the example proxy server 120. The example proxy log 122 includes a device identifier column 310, a source port column 315, a destination port column 320, a timestamp column 330, and an HTTP request column 340. The ellipses (" . . . ") at the bottom of FIG. 3 indicate that the table contains a truncated version of the table for purposes of illustration. Moreover, in the illustrated example of FIG. 3, the example proxy log 122 includes data associated with a single device and a single panelist (e.g., the panelist is represented by the destination port on the proxy server as explained above). However, in practice, the proxy log 122 generated by the proxy server 120 will include data associated with any number of different devices and/or any number of panelists. Further, the example proxy log 122 illustrates an example time period of approximately twenty-eight minutes. However, in practice, the proxy log 122 generated by the example proxy server 120 will include data associated with a longer time frame such as, for example, a hour, a day, a week, month, etc.

The example proxy log 122 of FIG. 3 includes a first row 350, a second row 360, a third row 370, a fourth row 380, a fifth row 390, and a sixth row 395, each of which is associated with a request made to the proxy server 120 by an example mobile device 110. The first example row 350 of the illustrated example of FIG. 3 includes a record that identifies that cPhone 5x associated with the destination port 50000 transmitted an HTTP request at 6:00:00 PM. The first and second example rows 350 and 360 include user agents 342, 343 identifying that the requests were associated with a SportsApp application. The example HTTP request of the example third row 370 includes a user agent 344 identifying that the request was associated with an embedded advertisement application (e.g., EmbAd). The example HTTP request of fourth example row 380 is associated with a Twitter™ application. The fifth example row 390 of the illustrated example of FIG. 3 includes a record that indicates that the cPhone 5x associated with the same port number 50000 transmitted an HTTP request associated with the embedded advertisement application at 6:17:42 PM. The sixth example row 395 includes a record that indicates another HTTP request associated with the Twitter™ application at 6:27 pm.

FIGS. 4A-4F illustrate a graphical depiction of the requests shown in the example proxy log 122 of FIG. 3. FIGS. 4A-4F also illustrate a visual representation of session identification as performed by the example creditor 135.

Figure 4A:
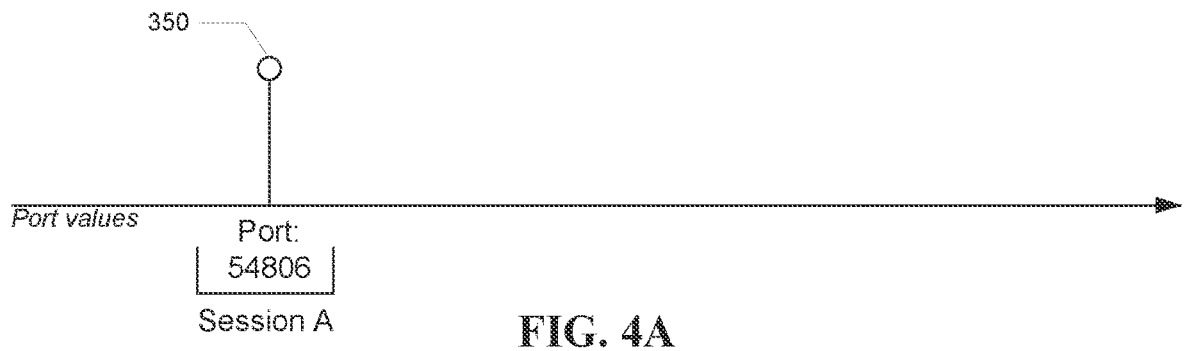
FIGS. 4A, 4B, 4C, 4D, 4E, and 4F are example charts of HTTP requests and sessioning performed by the example creditor of FIG. 1.

Turning to FIG. 4A, the example session classifier 140 of FIG. 1 accesses the first record 350 in the example proxy log 122. The first record 350 originated from port 54806 on the example mobile device 110. The first record 350 is then assigned a new session identifier, "Session A." Accordingly, the identifier "Session A" is associated with the record 350 by the example session classifier 140.

Figure 4B:
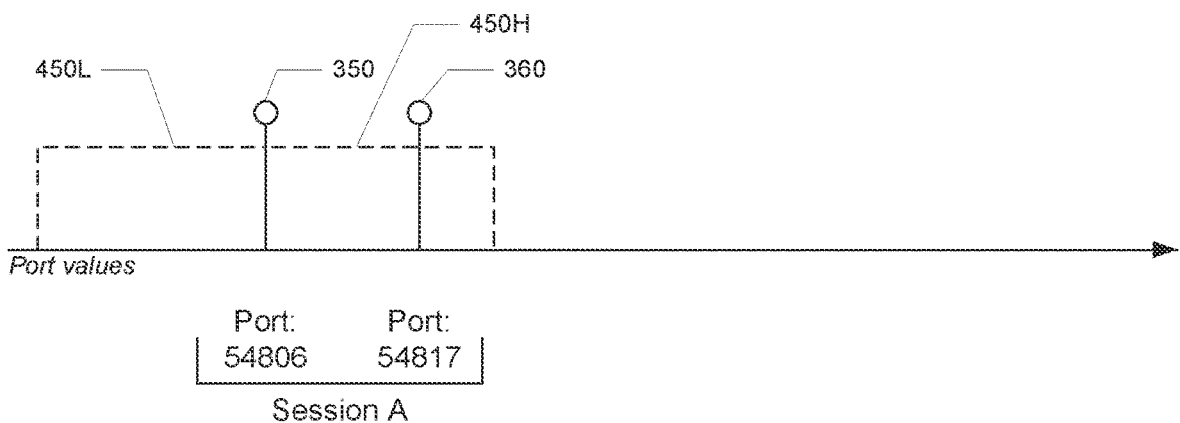

In FIG. 4B, the example session classifier 140 generates session windows 450L and 450H around the first record 350. The session windows 450L and 450H are windows generated to identify if a new record in the proxy log 122 belongs to the same usage session as a previous record. The bounds of the lower session window 450L in the illustrated example are from (1) fifteen ports below example port 54806 to (2) port 54806. The bounds of the upper session window 450H in the illustrated example are from (1) port 54806 to (2) fifteen ports above example port 54806. In the illustrated example, the HTTP requests outside the session windows 450L, 450H are determined to originate from new applications.

The session windows 450L, 450H are applied to the lowest and highest observed port numbers in a session. The session windows are placed on the boundary port numbers in a session in the event that a new port utilized in the usage session expands beyond the currently observed range of port numbers. In the illustrated examples of FIGS. 4B-4F, the port windows are fifteen ports "wide." Any HTTP request having a source port number between the boundary port numbers is considered to be part of the usage session. Accordingly, any HTTP request having a source port number within the session windows is also considered to be a part of the usage session. While the session windows 450L, 450H are illustrated in the example as having a width of 15 ports, the width of the session windows 450L, 450H are configurable to any desired width.

For example, an application may be used for ten minutes on a mobile device by a user, which utilizes one source port 1000. The user suspends the application (e.g., returns to the home screen of a device). When the user returns to the application to resume usage, a new session is started, and, accordingly, a new port is utilized which is at least fifteen ports away (e.g., greater or less than) from port 1000.

Returning to FIG. 4B, the example session classifier 140 accesses the second record 360 in the example proxy log 122 of FIG. 3. The example session classifier 140 determines that the second record 360 is within the session window 450H and, therefore, is also associated with the usage session, Session A. The example session classifier 140 associates the identifier "Session A" to the second record 360.

Figure 4C:
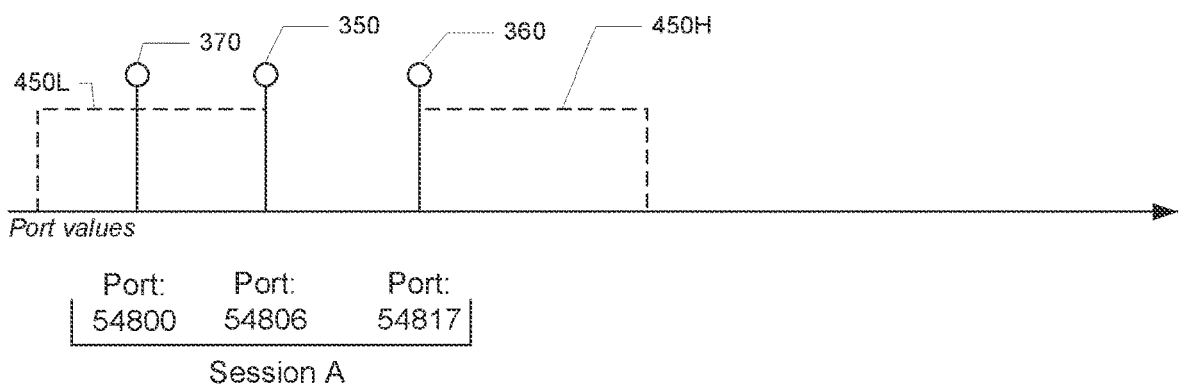

Turning to FIG. 4C, the example session classifier 140, as explained above, moves the session windows 450H and 450L to the highest and lowest observed port number records, the second record 360 and the first record 350. The example session classifier 140 accesses the third record 370. The example session classifier 140 determines that the third record 370 is within the lower session window 450L. Accordingly, the determination indicates that the third record 370 is also associated with "Session A." The example session classifier 140 associates the identifier "Session A" to the third record 370.

Figure 4D:
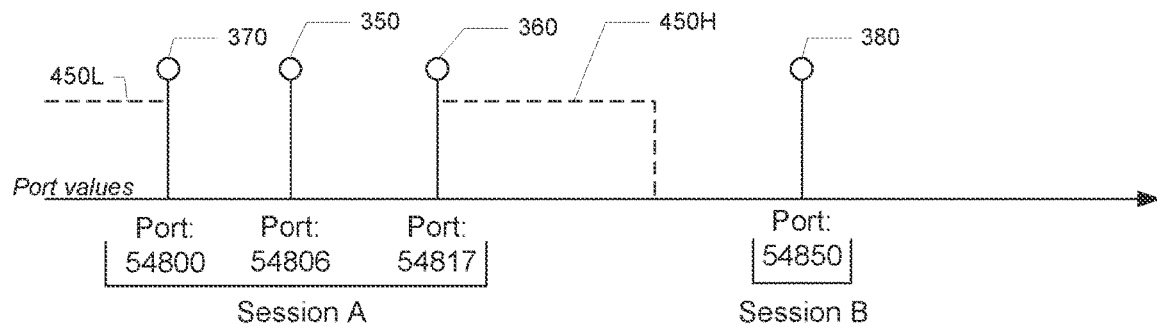

In FIG. 4D, the example session classifier 140 moves the session windows to the new boundary port records. The lower window 450L is associated with the third record 370 and the upper window 450H is associated with the second record 360. The example session identifier accesses the fourth record 380 and determines that the fourth record is beyond both the lower session window 450L and the upper session window 450H. In response to the fourth record 380 being beyond both of the session windows, the example session classifier 140 creates a new session identifier, "Session B." The "Session B" identifier is associated to the fourth record 380.

Figure 4E:
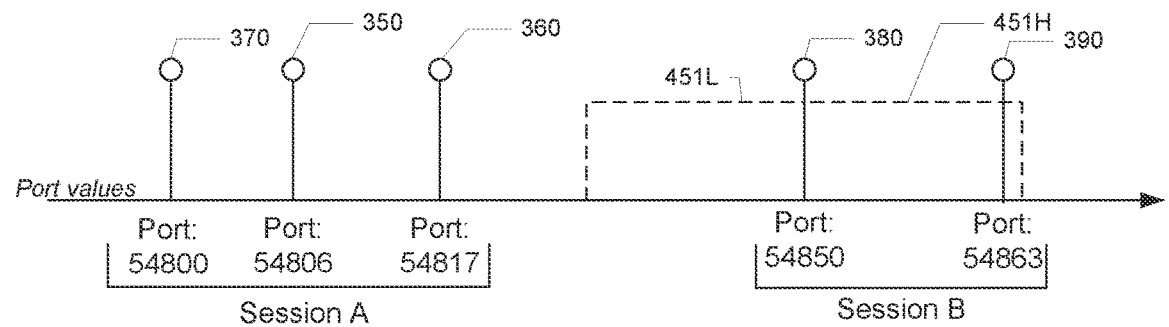

Turning to FIG. 4E, the example session classifier 140 creates new upper and lower session windows 451H and 451L. The example session classifier 140 accesses the fifth record 390 and determines it to be within the session window 451H, as a result, the fifth record 390 is determined to belong to "Session B" and is associated with a corresponding identifier.

In some examples, at least one of the session windows may overlap with a previously sessioned HTTP request record. For example, if lower session window 451L overlapped previously sessioned record 360. In these instances, a previously sessioned HTTP request record is not associated to the new session.

Figure 4F:
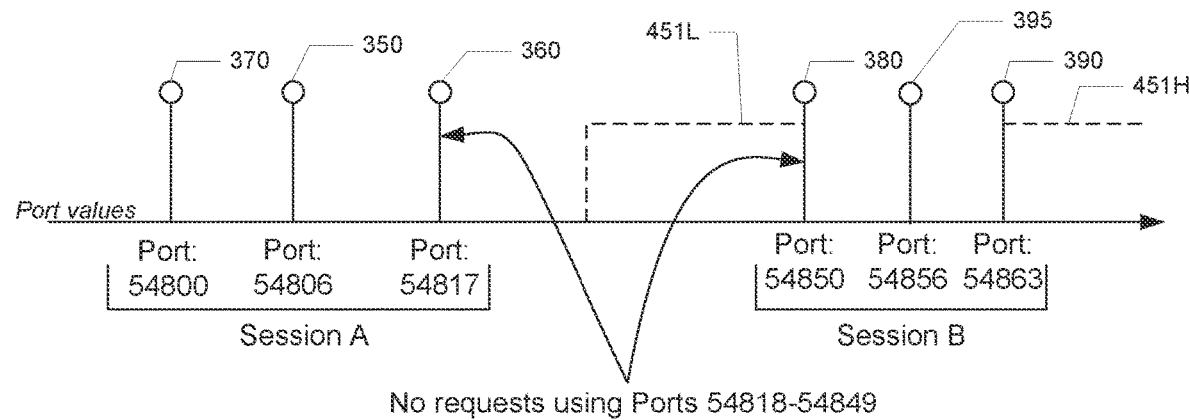

Moving to FIG. 4F, the example session classifier 140 institutes the session windows to the new upper and lower boundary of "Session B." The lower window 451L is associated with the fourth record 380 and the upper window 451H is associated with the fifth record 390. The example session classifier 140 accesses the sixth record 395 and determines that the source port of the sixth record 395 is between the source port of the fourth record 380 and the source port of the fifth record 390. Accordingly, the sixth record 395 is determined as belonging to Session B and has an identifier associated accordingly (e.g., added and/or watermarked into the session).

When a session has been identified, the example records belonging to the session are associated with a session identifier. In some examples, the session identifier is added to the records in an alternate field, or watermarked into the record. In other examples, the records for an identified session are extracted from the example proxy log 122 and stored as an individual collection. In some other examples, the session identifier is added to the user agents in the records of the example proxy log 122.

Figure 5A:
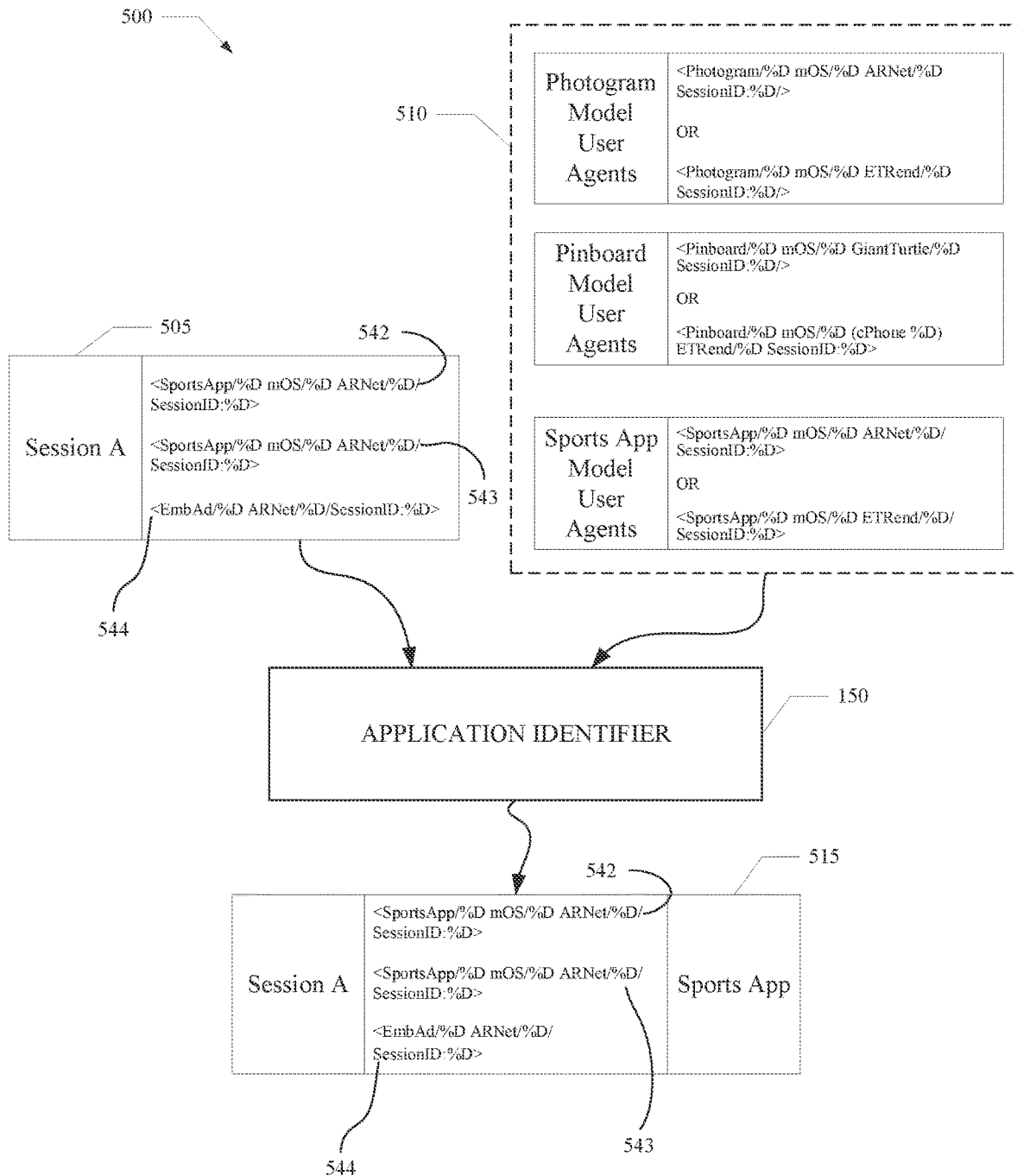
FIG. 5A is an example illustration of session classification performed by the example creditor of FIG. 1.

FIG. 5A is an example block diagram of classification of a session identified by the example session classifier 140. In the illustrated example, the example application identifier 150 obtains the user agent search strings associated with "Session A" 505 generated by the example request filter 145. The example application identifier 150 also obtains application patterns that contain model user agents and URLs associated with application network usage. In the illustrated example, the model user agents 510 which are obtained from the example data store 155 are depicted. The search strings 542, 543, 544 from "Session A" are checked against the retrieved model user agents 510 by the example application identifier 150. In the illustrated example of FIG. 5A, each search string 542, 543, 544 is identified as matching or not matching a model user agent from an application pattern. The application associated with the pattern generating the highest score is identified as the application associated with the session and associated to the session 515.

In the illustrated example, the model user agents 510 are retrieved from the example data store 155. The example model user agents 510 are for Sports App, Pinboard, and Photogram. Each of the example model user agents 510 are compared against the Session A search strings 542, 543, 544. In one example, when a user agent from the session 505 generates a TRUE value from any of the Boolean logic values, the session is then classified by the example application identifier 150 as being associated with the execution of the corresponding application. For example, in the illustrated example of FIG. 5A, the first Sports App user agent 542 would generate a TRUE value when checked against the first user agent in the SportsApp model user agents. Accordingly, Session A 505 is classified as being usage of SportsApp 515.

In some other examples, a matching search string generates a score (e.g., a count of the number of match points) representative of the overall degree of match between the session a search strings and the model user agent. For example, a match to a model user agent generates one point for a match. The two matches between Session A search strings 542, 543 and the Sports App model user agents generates two points, where the Pinboard model user agents and the Photogram model user agents generate no points. Based on the score, the example application identifier 150 classified Session A as being usage associated with Sports App because the Sports App model user agents generated a higher score (e.g., more match points) than any other application model user agents. The identified application (e.g., Sports App) is associated to the Session A records 515.

In some examples, substrings of the user agent data (e.g., SportsApp, mOS, ARNet, etc.) are used to create additional match points for the score. For example, each substring match generates further points. Thus, when using substrings in the illustrated example, matching a user agent would generate three points for a match. In other examples, each individual substring may be weighted (e.g., given more deference in the form of matching points) when a particular substring is more indicative of an application (e.g., the SportsApp substring).

In some other examples, negative Boolean logic may be implemented to provide another level of differentiation between multiple versions of an application. For example, some metered applications have both a "free" and a "paid" version. Typically, in such examples, the user agent of the free version may provide insight to the version (e.g., "SportsApp-Free"). To provide a proper classification between the versions, an override rule (e.g., a "NOT" Boolean logic rule) is implemented in the model user agents. For example, the model user agents of the paid version of SportsApp may contain a rule specifying "NOT<SportsApp-Free/% D . . . " In such an example, if the free version search string is generates a match during classification, the example application identifier 150 determines that this version cannot be the paid version and begins using other model user agents to classify the session.

In yet other examples, an application may not be classified in a session unless it meets a certain number of user agent matches in a session. For example, a rule in the model user agents may indicate that unless a user agent in a session (e.g., Session A 505) appears a threshold number of times (e.g., three times), the session is not indicative of usage of the associated application. While the rule is not depicted in example FIG. 5, if it were to be implemented using a threshold of three appearances, Session A 505 would not be classified as indicative of SportsApp usage.

Figure 5B:
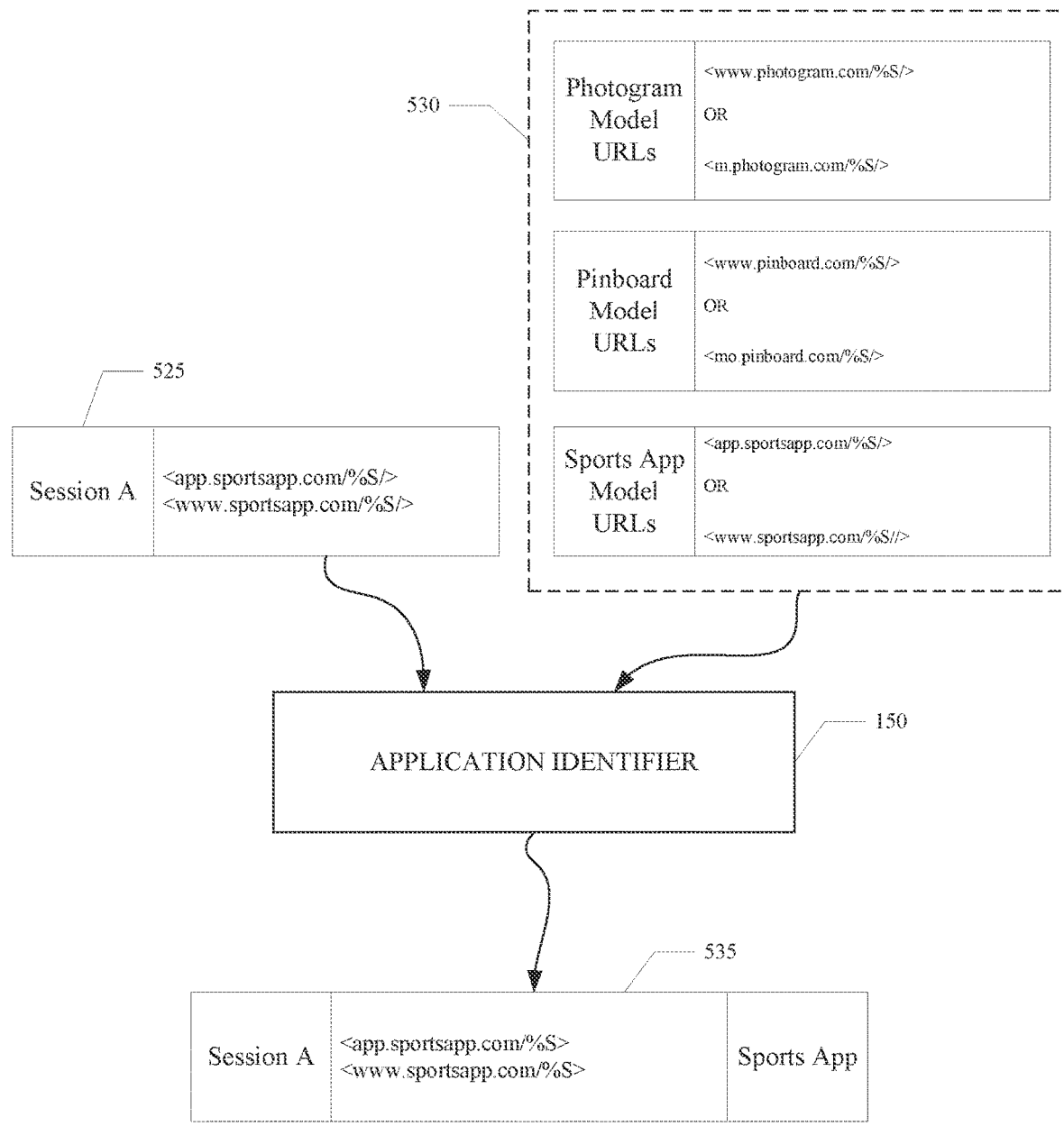
FIG. 5B is an example illustration of classification of sessions performed by the example creditor of FIG. 1.

From the foregoing, it will be appreciated that the same system may be used with URLs instead of user agents when the user agent is not indicative of a specific application as illustrated in example FIG. 5B. For example, some applications use common components (e.g., Web Kit) to obtain certain HTTP requests. In such an example, the user agents contained in the session might all be indicative of the common components of the mobile device 110.

FIG. 5B is an example block diagram of classification of a session identified by the example session classifier 140. In the illustrated example, the example application identifier 150 obtains the search strings of URLs of "Session A" 525 generated by the example request filter 145. The example application identifier 150 also obtains application patterns that contain model user agents and URLs associated with typical HTTP requests resulting from application execution. In the illustrated example, the model URLs 530 are depicted that are obtained from the example data store 155. The search strings of URLs from "Session A" are checked against the retrieved model URLs 530 by the example application identifier 150. In the illustrated example of FIG. 5B, each search string is identified as matching or not matching the current rule of an application pattern. The application associated with the pattern generating the highest score is identified as the application associated with the session and associated to the session 525.

In the illustrated example, the model URLs 530 are retrieved from the example data store 155. The example model URLs 530 are for Sports App, Pinboard, and Photogram. Each of the example model URLs 530 are checked against the Session A search strings 525. When a URL from the session 525 generates a TRUE value from any of the Boolean logic values, the session is then classified by the example application identifier 150 as being associated with the execution of the corresponding application. For example, in the illustrated example of FIG. 5B, the first Sports App URL would generate a TRUE value when checked against the first URL in the Sports App model URLs. Accordingly, Session A 525 is classified as being usage of Sports App 535.

In some other examples, a matching URL generates a point for a match to a model URL. The two matches between Session A search strings 525 and the Sports App model URLs generate a score of two points, where the Pinboard model URLs and the Photogram model URLs generate a score of no points. Based on the score, the example application identifier 150 classified Session A as being usage associated with Sports App because the Sports App model URLs generated more a higher score than any other application. The identified application is then associated to the Session A records 535.

Figure 6:
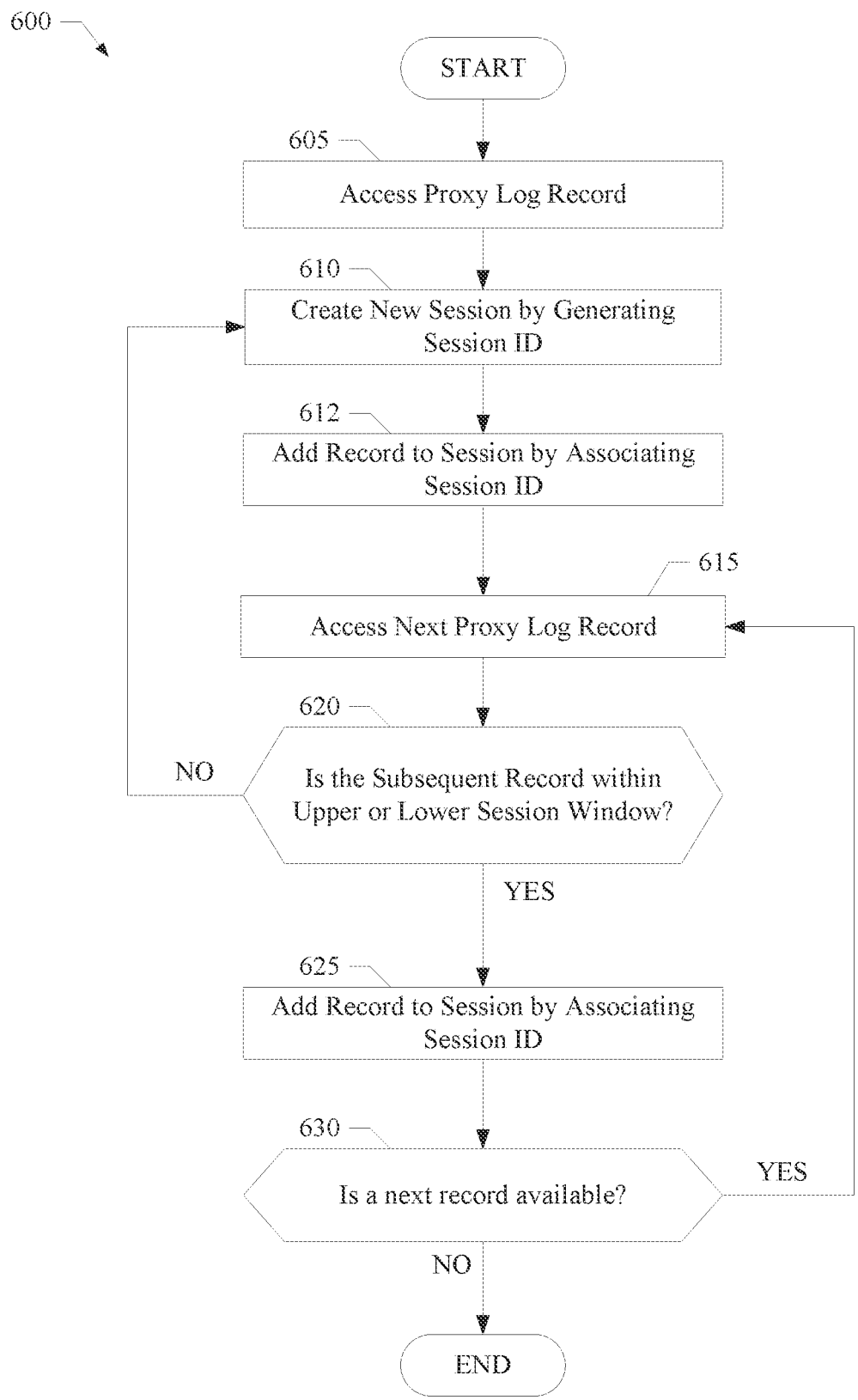
FIG. 6 is a flow diagram representative of example machine readable instructions that may be executed to implement the example creditor of FIG. 1 to form a session from the records in the proxy log.
Figure 7:
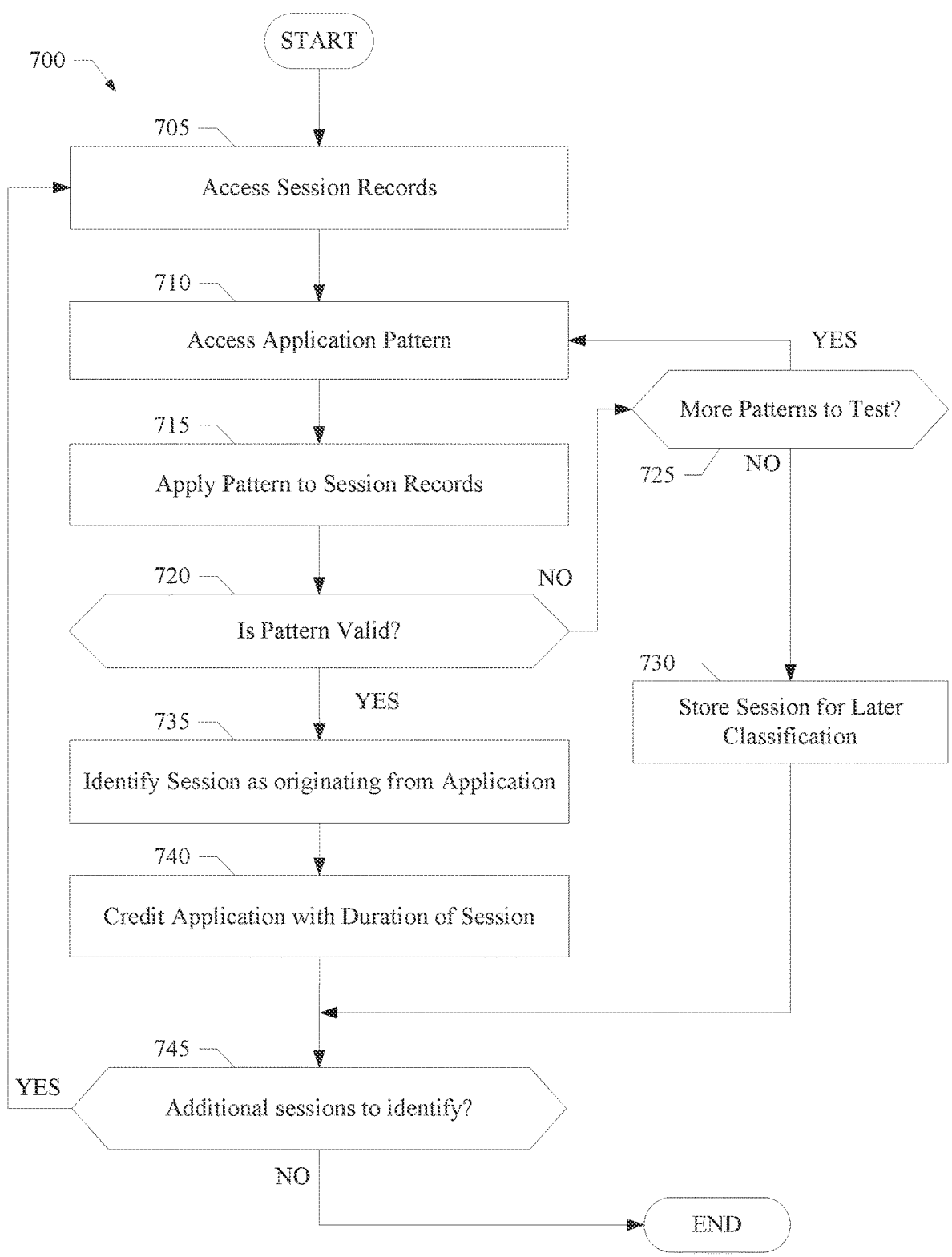
FIG. 7 is a flow diagram representative of example machine readable instructions that may be executed to implement the example creditor of FIG. 1 to associate sessions to applications.

Flowcharts representative of example machine readable instructions for implementing the example creditor 135 of FIG. 1 are shown in FIGS. 6 and 7. In these examples, the machine readable instructions comprise a program for execution by a processor such as the processor 1012 shown in the example processor platform 1000 discussed below in connection with FIGS. 6 and 7. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 6 and 7, many other methods of implementing the example creditor 135 may alternatively be used. For example, the order of execution of the blocks may be changed, and/or some of the blocks described may be changed, eliminated, or combined.

As mentioned above, the example processes of FIGS. 6 and 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6 and 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 6 is a flowchart representative of example machine readable instructions that may be executed to implement the example creditor 135 of FIG. 1. The example program 600 may be initiated, for example, when the example proxy log 122 is accessed, received, and/or obtained at the example creditor 135 from the example proxy server 120.

Initially, the example session classifier 140 accesses a record from the proxy log 122 (block 605). The example session classifier 140 then provisions a new session identifier to associate with the accessed record and associates the identifier to the accessed record (block 610). The accessed record is associated with the new session ID by the example session classifier 140 (block 612). The example session classifier 140 accesses the next record in the proxy log 122 (block 615). A determination is made by the example session classifier 140 of whether the record accessed (e.g., at block 615) is within the port range and/or within the session windows 450L and 450H (block 620).

If the determination made by the example session identifier 140 is that the record is not within the port range and/or the session windows, the example session classifier 140 generates a new session identification and associates it to the record (e.g., returns to block 610). However, if the record is determined to be within the port range and/or the session windows, the example session identifier associates the current session identifier to the record effectively adding it to the current session (block 625). The example session identifier then determines if any records remain in the proxy log 122 (block 630). If the example session classifier 140 determines that more records remain, the example session classifier 140 continues processing the proxy log 122 (e.g., returns to block 615). If no other records are determined to remain, the example session classifier 140 sends the sessioned proxy log 122 to the example request filter 145 for generating wildcarded search strings. After the transmission of the sessioned proxy log 122, the example flowchart 600 terminates until such a time that a new proxy log 122 arrives at the example creditor 135.

FIG. 7 is a flowchart representative of example machine readable instructions that may be executed to implement the example creditor 135 of FIG. 1. The example program 700 may be initiated, for example, when the example proxy log 122 has been sessioned by the example session classifier 140 of the example creditor 135 of FIG. 1.

The example program 700 begins when the example application identifier 150 receives (or obtains) the wildcarded search strings from the example request filter 145 (block 705). The example application identifier 150 accesses the application patterns indicative of application usage (e.g., the model user agents, URLs, minimum detections, etc.) from the example data store 155 (block 710). The example application identifier 150 begins applying one of the application patterns to each of the search strings of the session record (e.g., the records accessed at block 705). In some examples (e.g., match points), every search string from a session is tested against the application patterns. In other examples, the search strings are evaluated in a session until a TRUE value is detected.

If the example application identifier 150 determines that the applied application pattern does not match (e.g., does not evaluate as true) (block 720) then the example application identifier 150 determines if there are more patterns in the example data store 155 to apply to the session record (block 725). If no patterns are left to test, the example application identifier 150 stores the unclassified session in the data store for a later attempt at processing (block 730). If there are more patterns to test, the example application identifier 150 accesses the additional patterns from the example data store 155 (block 710).

In some examples, the example application identifier 150 will determine if there are enough patterns tested to make a determination on matching points (block 720). If a threshold number of application patterns have accumulated matching points, the application identifier 150 determines the application pattern having the most matching points and moves to associate the session with the corresponding application (block 735). If the threshold number of application patterns have not accumulated points, the example application identifier 150 will continue testing application patterns (block 725).

Returning to block 720, if the example application identifier 150 determines that the pattern is valid (e.g., evaluates as true), the session is classified as usage associated with the matching application (block 735).

Accordingly, the classified session is transmitted to the example reporter 160 which credits the application with usage from the session duration (block 740). In the illustrated example, the earliest timestamp of the records in the session is subtracted from the latest timestamp in the records to determine a total usage time of the session. The example application identifier 150 then determines if additional sessions in the proxy log 122 (or the example data store 155) exist that need to be classified (block 745). If there are additional sessions that require classification, the sessions are accessed by the example application identifier 150 (e.g., return to block 705). If no additional session require classification, the example program 700 terminates.

Figure 8:
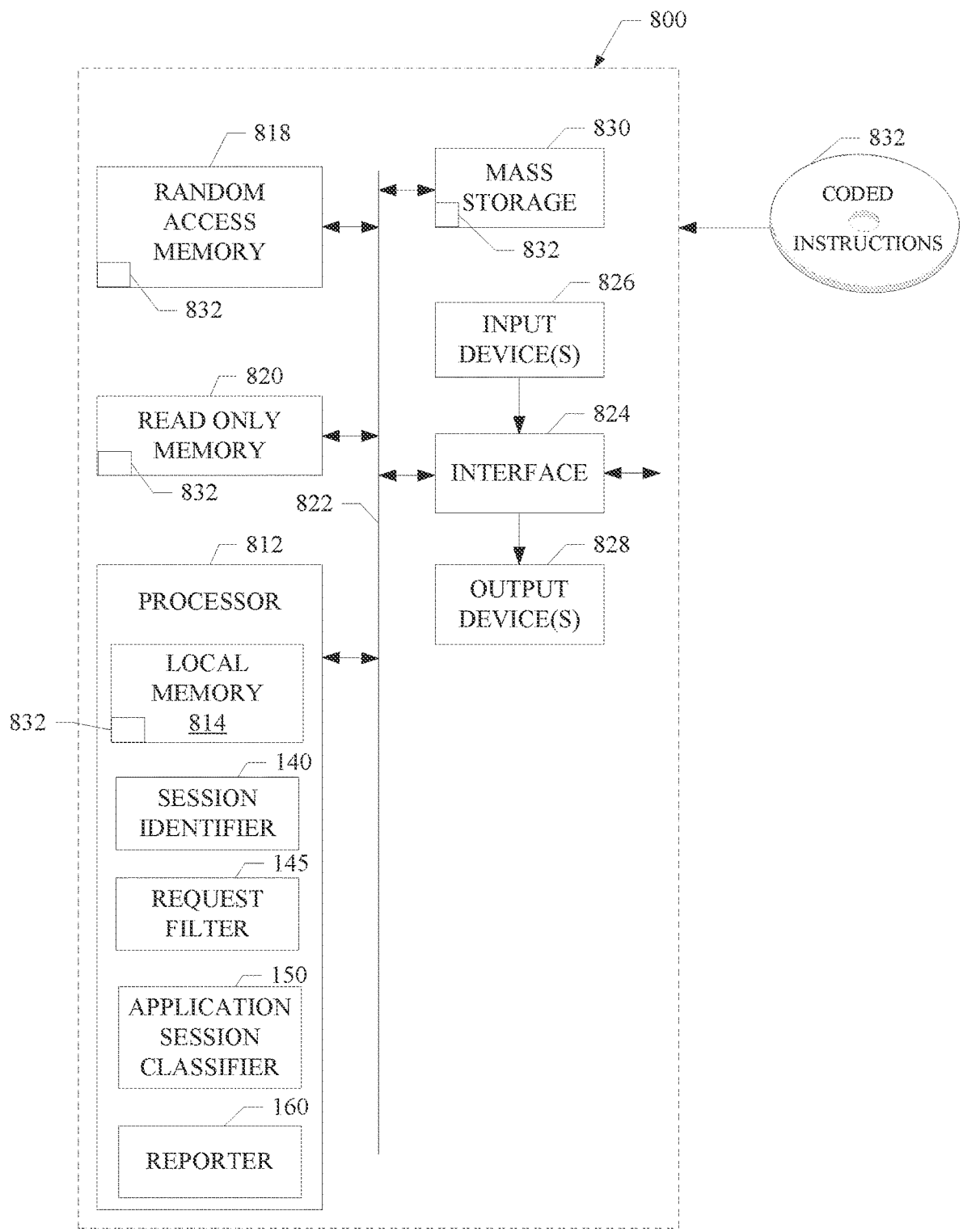
FIG. 8 is a block diagram of an example processor system that may execute any of the machine readable instructions represented by FIGS. 6 and 7 to implement the example creditor of FIG. 1.

FIG. 8 is a block diagram of an example processor platform 1000 capable of executing the instructions of FIGS. 6 and 7 to implement the example creditor 135 of FIG. 1. The processor platform 800 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 800 of the illustrated example includes a processor 812. The processor 1012 of the illustrated example is hardware. For example, the processor 812 can be implemented by one or more integrated circuits, logic circuits, microprocessors or controllers from any desired family or manufacturer. The processor also includes an example session classifier 140, an example request filter 145, an example application identifier 150, and an example reporter 160.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIGS. 6 and 7 may be stored in the mass storage device 828, in the volatile memory 814, in the non-volatile memory 816, and/or on a removable tangible computer readable storage medium such as a CD or DVD.

From the foregoing, it will be appreciated that the above disclosed methods, apparatus and articles of manufacture credit applications by port clustering. The disclosed examples provide the ability to remotely monitor a device in a monitoring panel. By instituting the monitoring remotely, precious system memory, processing power, battery power, and network bandwidth are released to the device no longer acting as a platform for on-device monitoring. The extra system memory and processing power greatly improve the functioning of the now remotely monitored devices. The extra resources further allow the mobile device to perform tasks faster and in some instances, more efficiently, than in other examples.

The disclosed examples also facilitate conservation of bandwidth in a monitored household. The disclosed examples may be used to consume bandwidth outside of the information flow of the household. In a household with limited bandwidth, by remotely monitoring the execution of applications, an audience measurement entity would not consume excess bandwidth by persistent transmission of proxy log 122s to the example creditor.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An audience measurement computing system comprising:
    a processor; and
    memory having stored therein machine readable instructions that, when executed by the processor, cause the audience measurement computing system to perform operations comprising:
        identifying a first request having a first source port number;
        identifying a second request having a second source port number, the first source port number and the second source port number associated with a device;
        grouping the first request and the second request as a first session when the second source port number is within a threshold number of ports from the first source port number;
        generating a session window based on the threshold number of ports; and
        crediting an application of the device with usage based on the session window.

2. The audience measurement computing system claim 1, wherein the operations further include applying the session window to lowest and highest source port numbers associated with a current session.

3. The audience measurement computing system claim 1, wherein the operations further include identifying the application when a user agent of the first request or the second request matches an application pattern associated with the application.

4. The audience measurement computing system of claim 3, wherein the operations further include generating a search string from the user agent, the search string filtered to remove numerical values with wildcarding.

5. The audience measurement computing system claim 1, wherein the operations further include identifying a third request having a third source port number, the third source port number within at least one of (1) a lower session window from the lower of the first and the second source port number or (2) an upper session window from the higher of the first and the second source port number.

6. The audience measurement computing system of claim 1, wherein the operations further include obtaining the first request and the second request from a proxy server.

7. The audience measurement computing system of claim 6, wherein the device is associated with a panelist, the proxy server intermediate to the device.

8. A non-transitory machine readable storage medium having stored thereon computer readable instructions that, when executed by a processor, cause performance of at least:
    identifying a first request having a first source port number;
    identifying a second request having a second source port number, the first source port number and the second source port number associated with a device;
    grouping the first request and the second request as a first session when the second source port number is within a threshold number of ports from the first source port number;
    generating a session window based on the threshold number of ports; and
    crediting an application of the device with usage based on the session window.

9. The non-transitory machine readable storage medium of claim 8, wherein the instructions, when executed by the processor, further cause performance of applying the session window to lowest and highest source port numbers associated with a current session.

10. The non-transitory machine readable storage medium of claim 8, wherein the instructions, when executed by the processor, further cause performance of identifying the application when a user agent of the first request or the second request matches an application pattern associated with the application.

11. The non-transitory machine readable storage medium of claim 10, wherein the instructions, when executed by the processor, further cause performance of generating a search string from the user agent, the search string filtered to remove numerical values with wildcarding.

12. The non-transitory machine readable storage medium of claim 8, wherein the instructions, when executed by the processor, further cause performance of identifying a third request having a third source port number, the third source port number within at least one of (1) a lower session window from the lower of the first and the second source port number or (2) an upper session window from the higher of the first and the second source port number.

13. The non-transitory machine readable storage medium of claim 8, wherein the instructions, when executed by the processor, further cause performance of obtaining the first request and the second request from a proxy server.

14. A method, comprising:
    identifying a first request having a first source port number;
    identifying a second request having a second source port number, the first source port number and the second source port number associated with a device;
    grouping the first request and the second request as a first session when the second source port number is within a threshold number of ports from the first source port number;
    generating a session window based on the threshold number of ports; and
    crediting an application of the device with usage based on the session window.

15. The method of claim 14, further including applying the session window to lowest and highest source port numbers associated with a current session.

16. The method of claim 15, further including identifying the application when a user agent of the first request or the second request matches an application pattern associated with the application.

17. The method of claim 16, further including generating a search string from the user agent, the search string filtered to remove numerical values with wildcarding.

18. The method of claim 14, further including identifying a third request having a third source port number, the third source port number within at least one of (1) a lower session window from the lower of the first and the second source port number or (2) an upper session window from the higher of the first and the second source port number.

19. The method of claim 14, further including obtaining the first request and the second request from a proxy server.

20. The method of claim 19, wherein the device is associated with a panelist, the proxy server intermediate to the device.

* * * * *